US011660831B2

(12) United States Patent
Jones et al.

(10) Patent No.: US 11,660,831 B2
(45) Date of Patent: May 30, 2023

(54) LAMINATION HEAD HAVING BI-DIRECTIONAL CAPABILITY

(71) Applicant: The Boeing Company, Chicago, IL (US)

(72) Inventors: Darrell D. Jones, Mill Creek, WA (US); Raviendra S. Suriyaarachchi, Kirkland, WA (US); James R. Kendall, Mt. Pleasant, SC (US); Paul D. Shaw, Charleston, SC (US); Sergio Urzainqui, Torres de Elorz (ES); Manuel Motilva, Pamplona (ES)

(73) Assignee: Ths Boeing Company, Arlington, VA (US)

( * ) Notice: Subject to any disclaimer, the term of this patent is extended or adjusted under 35 U.S.C. 154(b) by 0 days.

(21) Appl. No.: 17/456,248

(22) Filed: Nov. 23, 2021

(65) Prior Publication Data
US 2022/0176656 A1    Jun. 9, 2022

(30) Foreign Application Priority Data

Dec. 4, 2020   (EP) .................................... 20383065

(51) Int. Cl.
*B32B 41/00*    (2006.01)
*B29C 70/54*    (2006.01)
*B29C 70/38*    (2006.01)

(52) U.S. Cl.
CPC ............ *B29C 70/54* (2013.01); *B29C 70/388* (2013.01)

(58) Field of Classification Search
CPC ........ B29C 70/54; B29C 70/388; B29C 70/56
USPC ..................... 156/60, 64, 350, 351, 378, 379
See application file for complete search history.

(56) References Cited

U.S. PATENT DOCUMENTS

| 4,234,374 A | 11/1980 | Frank |
| 4,259,144 A | 3/1981 | Ballentine |
| 4,285,752 A | 8/1981 | Higgins |
| 4,382,836 A | 5/1983 | Frank |
| 5,397,415 A | 3/1995 | Manabe |

(Continued)

FOREIGN PATENT DOCUMENTS

| EP | 2130666 | 12/2009 |
| EP | 3647029 | 6/2020 |

OTHER PUBLICATIONS

EPO, European Search Report, Appl. No. 20383065.8, dated Jun. 4, 2021.

*Primary Examiner* — Michael N Orlando
*Assistant Examiner* — Joshel Rivera

(57) ABSTRACT

A lamination head for laying up a composite laminate includes a material supply drum supporting roll of layup material backed by a backing layer, a first and second separation device respectively having a first and second horn, and a first and second compaction device. When the first separation device is extended, the first horn is in close proximity to the first compaction device, causing a layup material to separate from the backing layer and move underneath the first compaction device as the lamination head moves along a first direction of travel. When the second separation device is extended, the second horn is in close proximity to the second compaction device, causing the layup material to separate from the backing layer and move underneath the second compaction device as the lamination head moves along a second direction of travel opposite the first direction of travel.

20 Claims, 15 Drawing Sheets

(56) References Cited

U.S. PATENT DOCUMENTS

| | | | |
|---|---|---|---|
| 5,979,531 | A | 11/1999 | Barr |
| 7,137,182 | B2 | 11/2006 | Nelson |
| 7,527,759 | B2 | 5/2009 | Lee et al. |
| 7,655,168 | B2 | 2/2010 | Jones et al. |
| 7,879,177 | B2 | 2/2011 | McCowin et al. |
| 7,922,856 | B2 | 4/2011 | Hagman et al. |
| 8,012,291 | B2 | 9/2011 | Kisch et al. |
| 8,206,540 | B2 | 6/2012 | Evans |
| 8,336,596 | B2 | 12/2012 | Nelson et al. |
| 8,465,613 | B2 | 6/2013 | Rotter et al. |
| 8,640,757 | B2 | 2/2014 | McCowin et al. |
| 8,758,538 | B2 | 6/2014 | Borgmann et al. |
| 8,808,490 | B2 | 8/2014 | Hagman et al. |
| 9,399,338 | B1 | 7/2016 | Metschan |
| 10,814,570 | B2 | 10/2020 | Shaw |
| 10,926,492 | B2 | 2/2021 | Shaw |
| 2004/0026025 | A1 | 2/2004 | Sana |
| 2014/0150964 | A1 | 6/2014 | Schaaf |
| 2015/0328876 | A1 | 11/2015 | Nishimura |
| 2019/0224928 | A1 | 7/2019 | Danninger |
| 2020/0139647 | A1* | 5/2020 | Shaw .................... B29C 70/545 |

* cited by examiner

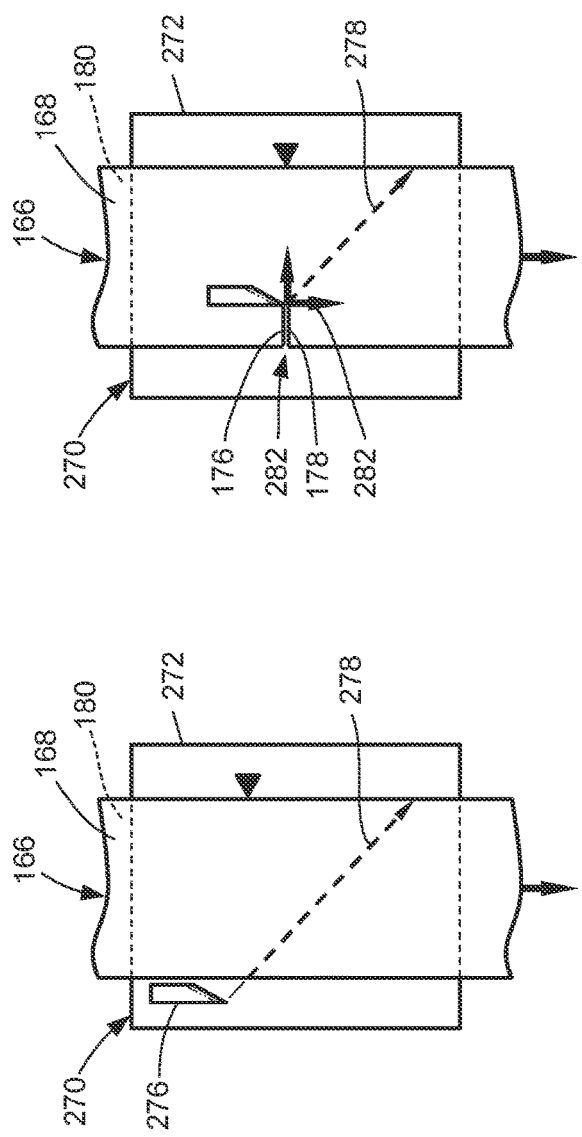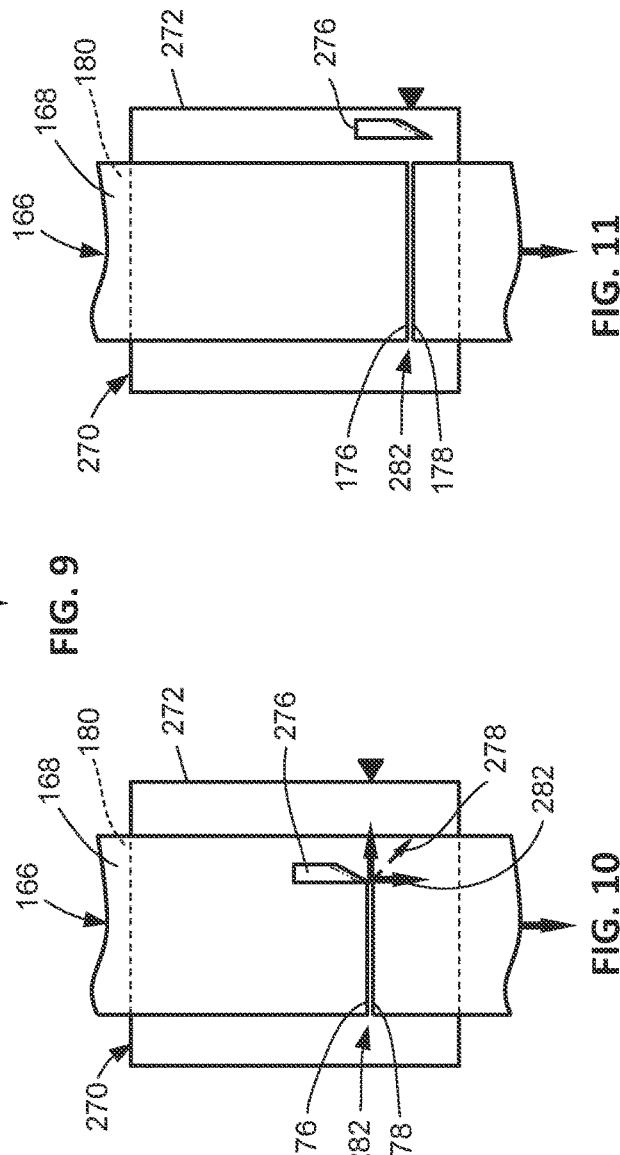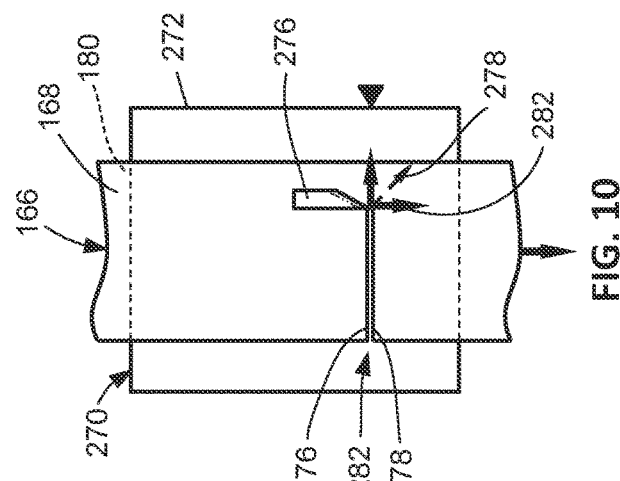

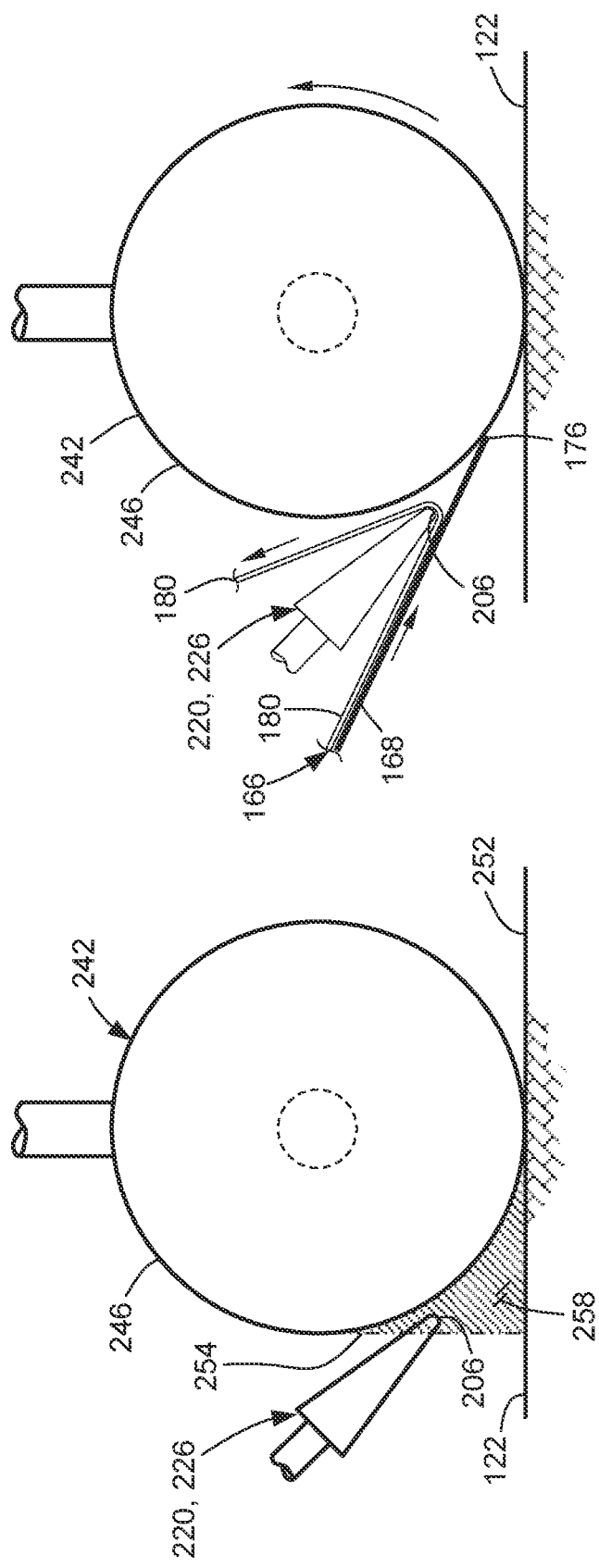

LAMINATION HEAD HAVING BI-DIRECTIONAL CAPABILITY

FIELD

The present disclosure relates generally to manufacturing systems and, more particularly, to a lamination head for laying up composite laminates, and which has bi-directional layup capability.

BACKGROUND

Composite materials are used in a wide variety of applications due to their favorable properties such as high specific strength, high specific stiffness, and high corrosion resistance. The manufacturing of a composite structure typically involves laying up multiple plies of layup material in a stacked formation on a lamination surface to form a composite laminate. The layup material is typically a fibrous material that is pre-impregnated with uncured resin (e.g., prepreg). For example, the layup material may be epoxy-impregnated carbon fiber prepreg.

Automated layup machines enable the layup of composite laminates at relatively high production rates due to the relatively high layup material deposition rates of automated layup machines. A tape lamination head is one type of automated layup machine in which a continuous strip of layup material such as prepreg tape is dispensed from the lamination head onto a lamination surface as the lamination head is moved relative to the lamination surface. For example, a lamination head may dispense layup material while moving over a stationary lamination surface. Alternatively the lamination head may be stationary, and the lamination surface may move underneath the lamination head while the lamination head dispenses layup material. A lamination head may form each composite ply by successively laying up rows or courses of tape in side-by-side parallel relation to each other.

A conventional lamination head may lay up each new course of tape while moving in a first direction of travel relative to the lamination surface. At the end of a course, the lamination head lifts off of the lamination surface and moves back over the lamination surface in a second direction of travel opposite the first direction of travel, and starts applying another course of tape along the first direction. The off-part movement of the lamination head each time it moves along the second direction undesirably adds to production flow time.

In attempts to reduce off-part movement, certain types of lamination heads may be configured to rotate 180 degrees at the end of laying up a first course of layup material, and then reverse direction to lay up a second course of layup material alongside or over the first course. The capability for rotating the lamination head adds complexity to the manufacturing system due to the need to rotate the entire weight of the lamination head, the material supply, support cabling, and other associated components. Further adding to the complexity is the need to temporarily lift the lamination head off of the lamination surface prior to rotation, and then lower the lamination head back down onto the lamination surface once rotation is complete.

In another attempt to reduce off-part movement, some conventional manufacturing systems include a first lamination head configured to dispense layup material while moving along a first direction of travel, and a second lamination head configured to dispense layup material while moving along a second direction of travel. However, such a manufacturing system doubles the quantity of lamination heads, and therefore increases the cost, complexity, and overall size of the manufacturing system.

As can be seen, there exists a need in the art for a lamination head that reduces off-part movement of the lamination head, and which avoids the costs and complexities associated with conventional manufacturing systems.

SUMMARY

The above-noted needs associated with manufacturing composite laminates are specifically addressed and alleviated by the present disclosure which provides a lamination head having bi-directional layup capability for laying up a composite laminate. The lamination head includes a material supply drum configured to support a material roll of backed material. The backed material comprises layup material backed by a backing layer. The lamination head also includes a first separation device and a second separation device respectively having a first horn and a second horn each movable between a separation device retracted position and a separation device extended position respectively associated with the first separation device and second separation device. The lamination head additionally includes a first compaction device and a second compaction device configured to alternatingly apply compaction pressure onto the layup material against a substrate at a layup material compaction point. When the first separation device is in the separation device extended position, the first horn is in close proximity to the layup material compaction point associated with the first compaction device, and the first horn is configured to cause the layup material to separate from the backing layer and direct the layup material toward the substrate and underneath the first compaction device as the lamination head moves along a first direction of travel. When the second separation device is in the separation device extended position, the second horn is in close proximity to the layup material compaction point associated with the second compaction device, and the second horn is configured to cause the layup material to separate from the backing layer and direct the layup material toward the substrate and underneath the second compaction device as the lamination head moves along a second direction of travel opposite the first direction of travel.

Also disclosed is a lamination head having bi-directional layup capability, including a material supply drum, first and second separation devices, and first and second compaction devices, as described above. When the first separation device is in the separation device extended position and the second separation device is in the separation device retracted position, the first horn is in close proximity to the layup material compaction point associated with the first compaction device for separating the layup material from the backing layer as the lamination head moves along a first direction of travel. When the second separation device is in the separation device extended position and the first separation device is in the separation device retracted position, the second horn is in close proximity to the layup material compaction point associated with the second compaction device for separating the layup material from the backing layer as the lamination head moves along a second direction of travel opposite the first direction of travel.

In addition, disclosed is a method of bi-directionally applying layup material onto a substrate. The method includes feeding a backed material from a material roll to a backing layer separation assembly of a lamination head. The material roll is mounted on a material supply drum. The backed material comprises layup material backed by a backing layer. The backing layer separation assembly has a first separation device and a second separation device respectively having a first horn and a second horn. The method includes moving the first horn into close proximity to a layup material compaction point associated with a first compaction device. In addition, the method includes separating, using the first horn, the layup material from the backing layer and directing the layup material toward the layup material compaction point associated with the first compaction device while moving the lamination head along a first direction of travel. Furthermore, the method includes retracting the first horn away from the first compaction device, and moving the second horn into close proximity to a layup material compaction point associated with a second compaction device. The method also includes separating, using the second horn, the layup material from the backing layer and directing the layup material toward the layup material compaction point associated with the second compaction device while moving the lamination head along a second direction of travel opposite the first direction of travel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a view of the cutter assembly taken along line 8-8 of FIG. 6, and illustrating an example of a cutter blade configured to cut the layup material along a blade angle path that is complementary to the material feed rate of the backed material;

FIG. 9 is a view of the cutter assembly showing further progression of the cutter blade moving along the blade path angle to cut the layup material along an intended cut line;

FIG. 10 is a view of the cutter assembly showing still further progression of the cutter blade during cutting of the layup material along the intended cut line which, in the example shown, is oriented perpendicular to the lengthwise direction of the backed material;

FIG. 11 is a view of the cutter assembly after cutting the layup material along the intended cut line;

FIG. 20 is a magnified view of the portion of the lamination head identified by reference numeral 20 of FIG. 19, and illustrating the horn distal end of the second horn located within a second notch region defined between the compaction device outer surface of the second compaction device, the horizontal tangent to the compaction device outer surface, and the vertical tangent to the compaction device outer surface;

FIG. 21 shows the horn distal end of the second compaction device separating the layup material from the backing layer, and directing the layup material toward the substrate and underneath the second compaction device during relative movement of the lamination head along the second direction of travel;

DETAILED DESCRIPTION

Figure 1:
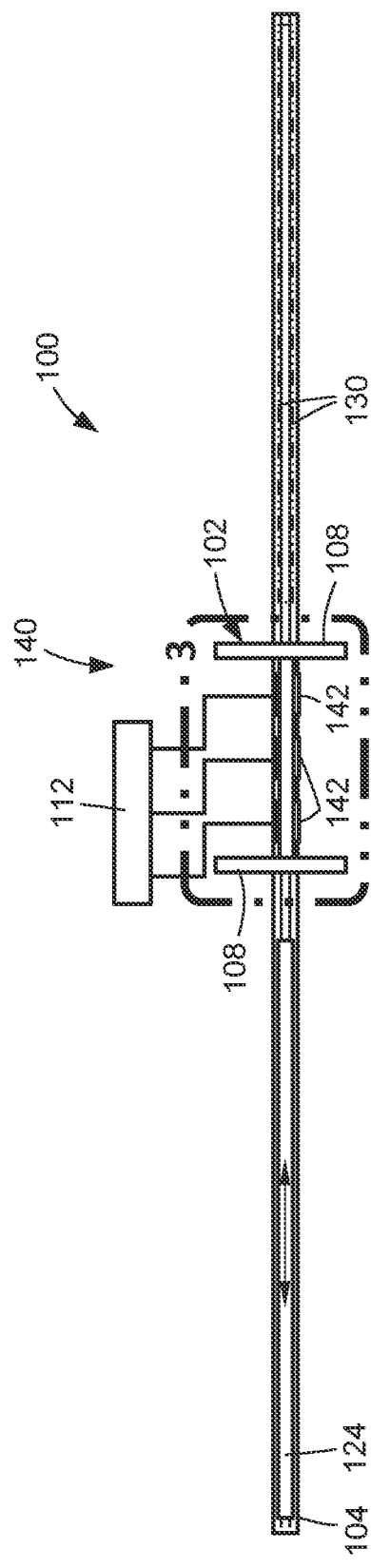
FIG. 1 is top view of an example of a manufacturing system for laying up a composite laminate, and which includes a series of lamination heads, each having bi-directional layup capability for dispensing layup material onto a substrate during relative movement of the lamination head along a first direction of travel, and along a second direction of travel opposite the first direction of travel.
Figure 2:
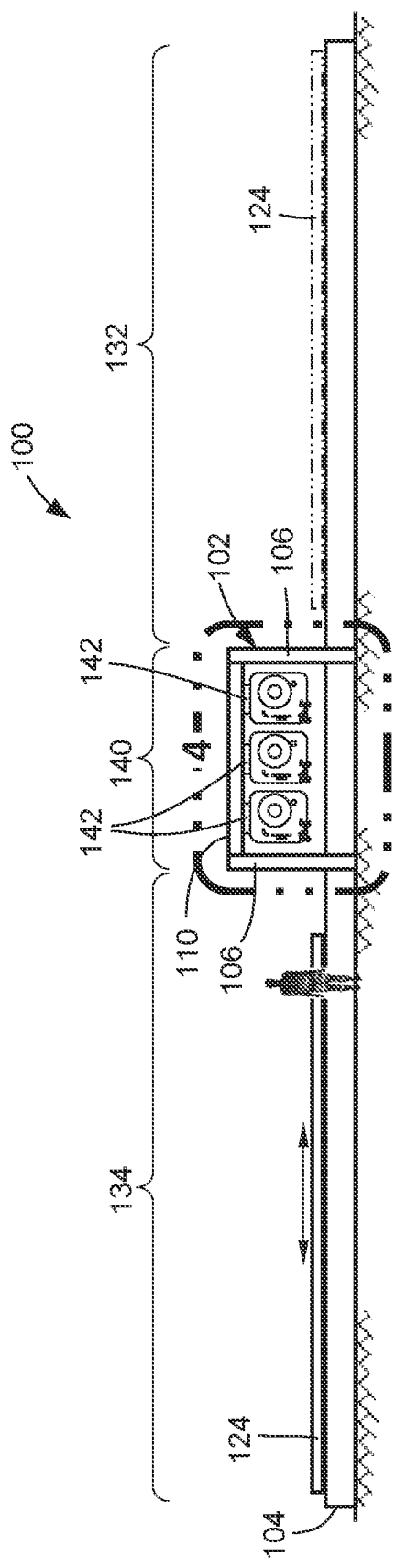
FIG. 2 is a side view of the manufacturing system of FIG. 1.
Figure 3:
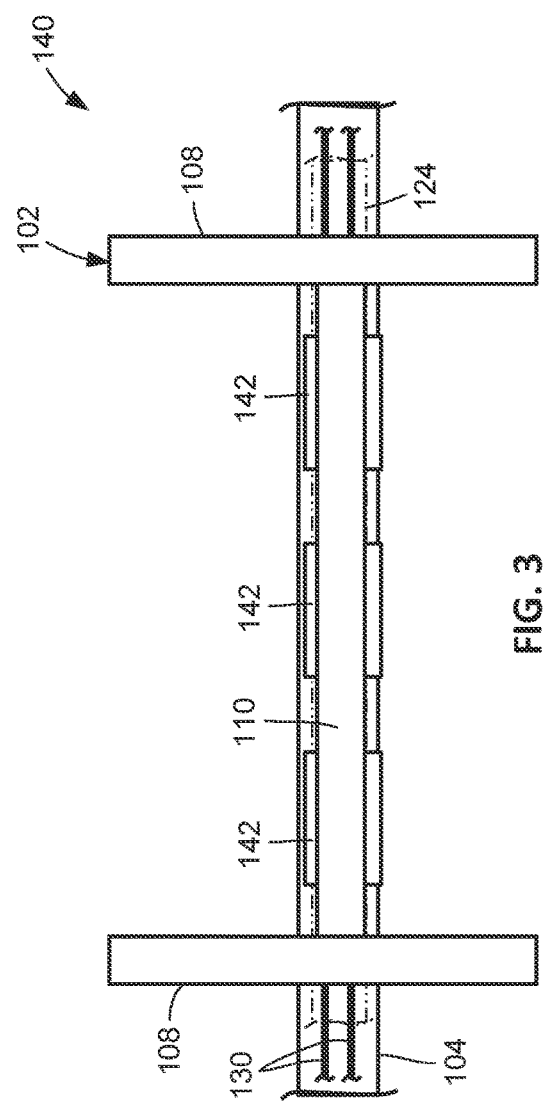
FIG. 3 is a magnified view of the portion of the manufacturing system identified by reference numeral 3 of FIG. 1, and illustrating the series of lamination heads supported by a lamination head support structure.
Figure 4:
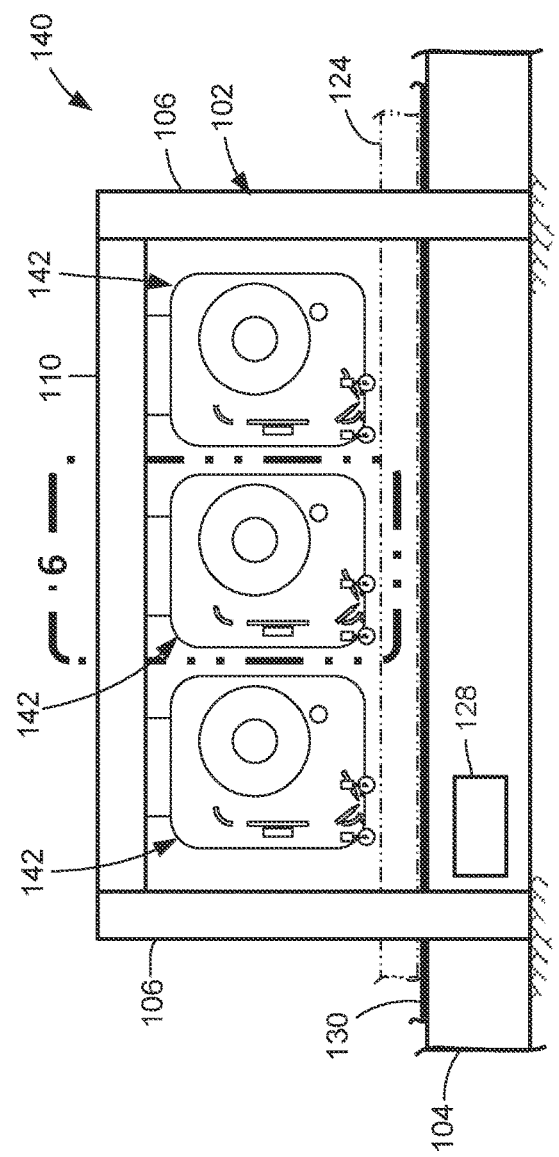
FIG. 4 is a magnified view of the portion of the manufacturing system identified by reference numeral 4 of FIG. 2, and illustrating the lamination heads supported above a lamination mandrel that is movable relative to the lamination heads, which are stationary.
Figure 5:
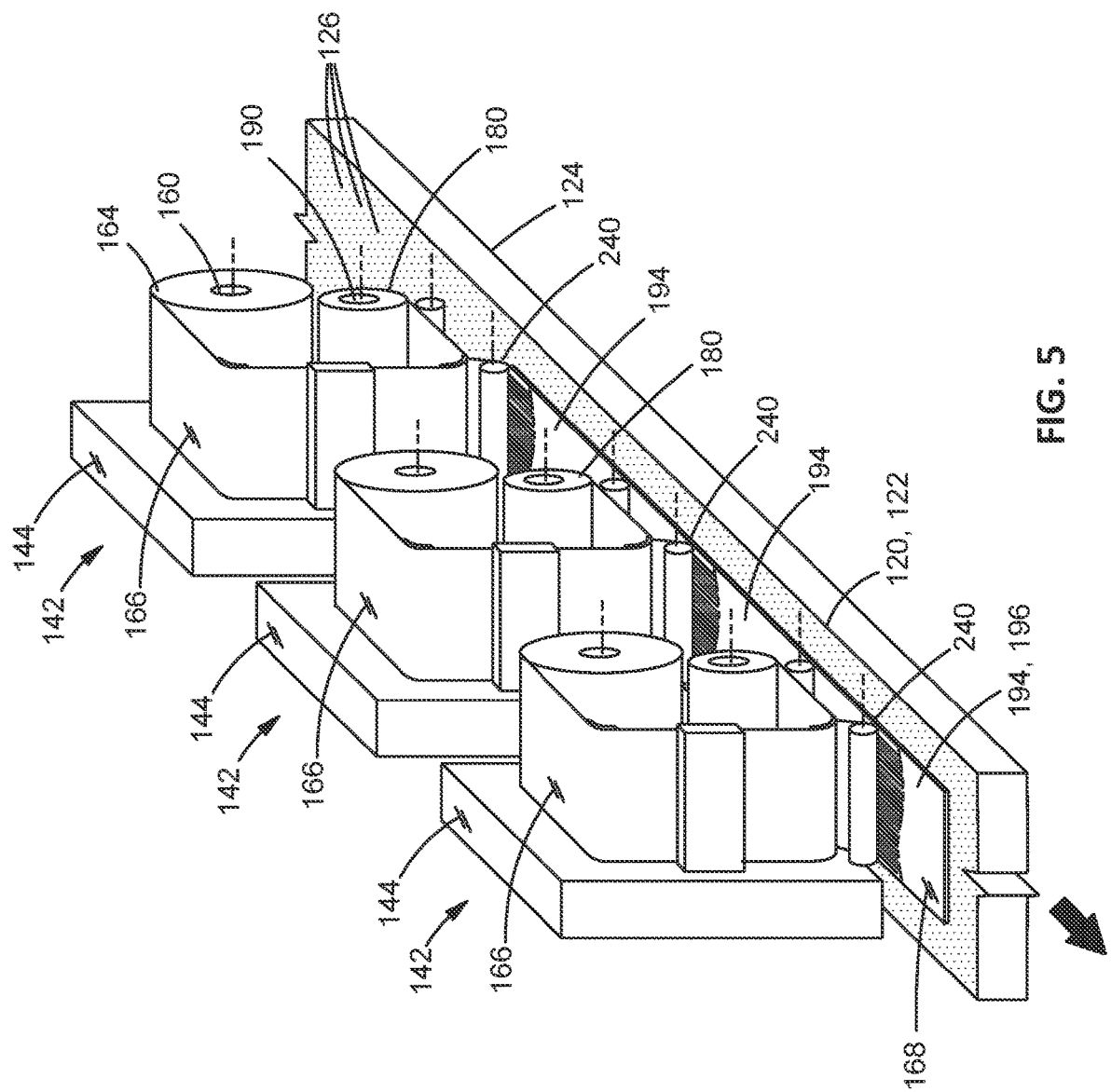
FIG. 5 is a perspective view of an example of a series of lamination heads applying layup material onto a substrate (e.g., a lamination mandrel) moving underneath the lamination heads.

Referring now to the drawings which illustrate preferred and various examples of the disclosure, shown in FIG. 1 is top view of an example of a manufacturing system 100 having a lamination station 140 containing an end-to-end series of lamination heads 142 (e.g., fiber placement heads) for laying up an uncured composite laminate 196 (FIG. 5). FIG. 2 is a side view of the manufacturing system 100. FIGS. 3 and 4 are respectively top and side views of the lamination station 140 showing the series of lamination heads 142. FIG. 5 is a perspective view of an example of a series of lamination heads 142 applying courses 194 of layup material 168 onto a substrate 122 or lamination surface 120 such as lamination mandrel 124, moving underneath the lamination heads 142. Each of the lamination heads 142 has bi-directional layup capability for dispensing layup material 168 onto the substrate 122. In this regard, each lamination head 142 is configured to dispense layup material 168 during movement relative to the substrate 122 (e.g., lamination mandrel 124) along a first direction of travel 150 (FIG. 12), and also dispense layup material 168 during movement relative to the substrate 122 along a second direction of travel 152 (FIG. 18) opposite the first direction of travel 150.

The bi-directional layup capability of the lamination heads 142 enables a relatively higher rate of manufacturing than is achievable with lamination heads that are limited to dispensing layup material 168 along a single direction of travel. In this regard, the bi-directional capability of the lamination heads 142 reduces off-part movement of the lamination heads 142 that would otherwise be required if each lamination head were limited to dispensing layup material 168 while moving in a single direction of travel. For example, lamination heads (not shown) that are limited to dispensing layup material 168 in a single direction of travel require the lamination heads to lift off of the substrate 122 at the end of each course 194 of layup material 168, move back over the substrate 122 in a second direction of travel 152 opposite the first direction of travel 150, and start applying another course 194 of layup material 168 over or parallel to the previous course 194 of layup material 168 while moving along the first direction of travel 150. As may be appreciated, the elimination of off-part movement of the presently-disclosed bi-directional lamination heads 142 significantly reduces the amount of time required to lay up the composite laminate 196.

As mentioned above, the bi-directional layup capability of the presently-disclosed lamination heads 142 also provides advantages relative to lamination heads (not shown) configured to rotate 180 degrees at the end of a first course of layup material 168, and then reverse direction to lay up a second course of layup material 168 alongside or over the first course. As indicated above, a rotating lamination head may be more complex and heavier than a non-rotating lamination head. In the case of multiple lamination heads (not shown) arranged in series, rotation of the individual lamination heads may be prohibitive due to proximity of adjacent lamination heads, which may limit clearance of the lamination heads during rotation. Advantageously, avoiding the need for rotating the presently-disclosed lamination heads 142 may significantly reduce cost and complexity.

Figure 12:
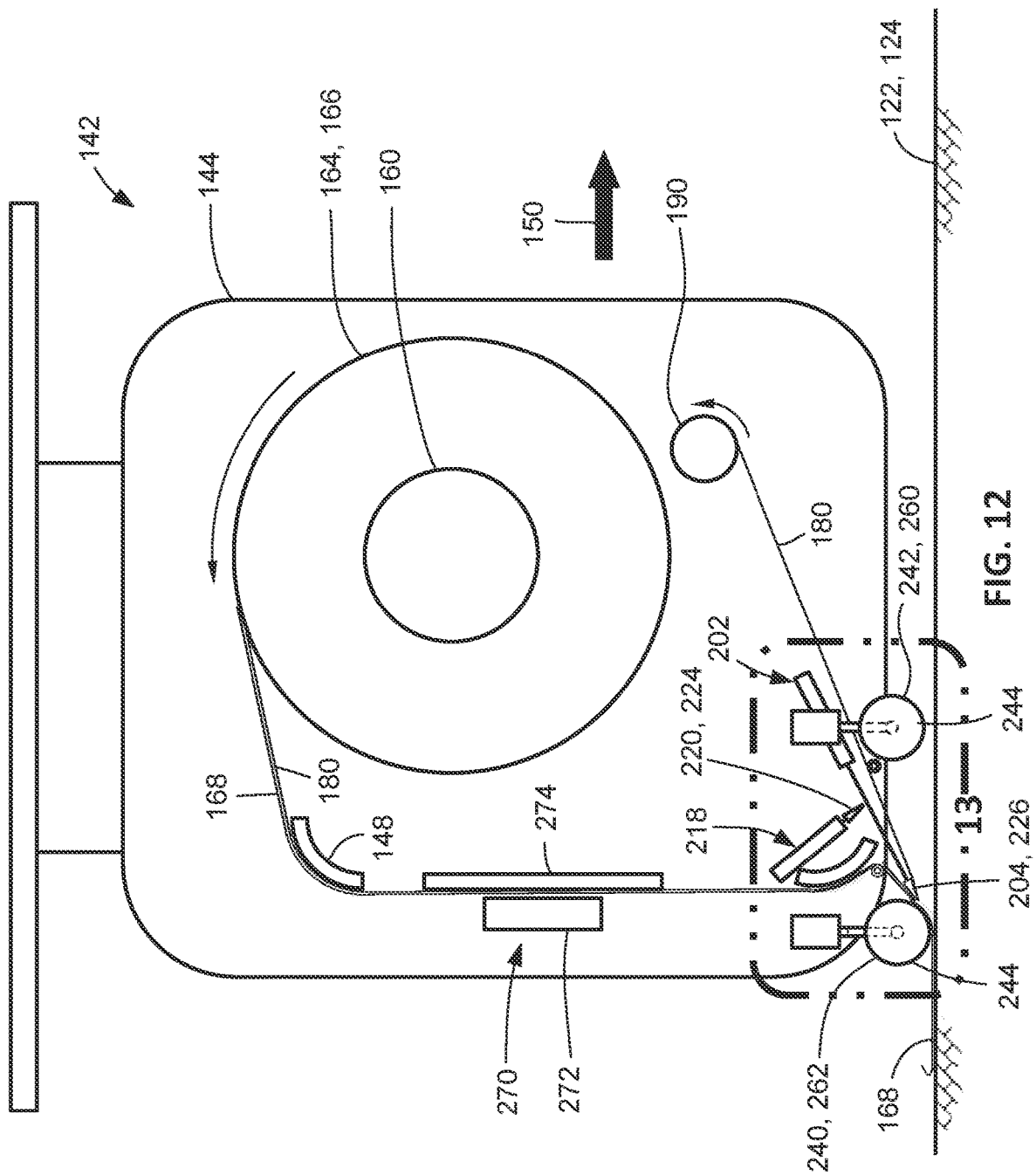
FIG. 12 shows the lamination head dispensing layup material onto the substrate during movement relative to the substrate along the first direction of travel.

As described in greater detail below, the layup material 168 (FIG. 13) dispensed by each lamination head 142 is initially supported by a backing layer 180 (FIG. 13) and is wound on a material roll 164 (FIG. 12). The backing layer 180 may be formed of a material that prevents adjacent wraps of layup material 168 from sticking to each other on the material roll 164. In addition, the backing layer 180 may provide a means for carrying tension when pulling (e.g., via the backing layer collection drum 190) the layup material 168 through the lamination head 142 without applying tension to the layup material 168. The backing layer 180 may be a paper material that is silicone-coated on one side, or the backing layer 180 may be a thin plastic film such as polyethylene film, or another material for releasably supporting the layup material 168. Each lamination head 142 includes a backing layer separation assembly 200 (FIG. 6) as described below for separating the layup material 168 from the backing layer 180 just prior to the layup material 168 being applied onto the substrate 122.

Advantageously, each lamination head 142 is configured such that the separation of the layup material 168 from the backing layer 180 occurs at a relatively short distance (e.g., see FIGS. 16 and 22) from a compaction device 240, 242, and in a manner which reduces or eliminates tension in an unsupported section of the layup material 174 (e.g., FIGS. 16 and 22) just prior to compaction of the layup material 168 onto the substrate 122 by a compaction device 240, 242. The reduction or elimination of tension in the layup material 168 prior to compaction onto the substrate 122 advantageously reduces stretching of the layup material 168, relative to an increased amount of stretching that may occur in layup material 168 dispensed from a conventional lamination head. When stretched layup material (not shown) is applied to the substrate 122 (e.g., previously-applied layup material), the stretched layup material will attempt to contract back its nominal or unstretched length. However, the previously-applied layup material, such as 0-degree composite tape (not shown) having axially-oriented reinforcing fibers, resists the contraction of the stretched layup material, and which results in bunching or local lifting of the composite plies or courses of the composite laminate. The bunching and/or local lifting may accumulate with subsequently applied layup material, unless the composite laminate is reworked. Advantageously, in the presently-disclosed lamination head 142, reduced stretching of the layup material 168 prior to compaction onto the substrate 122 reduces or eliminates local bunching that may otherwise occur in the composite laminate 196 (FIG. 5). In this regard, the presently-disclosed lamination head 142 improves the quality of the final composite laminate (not shown).

Figure 18:
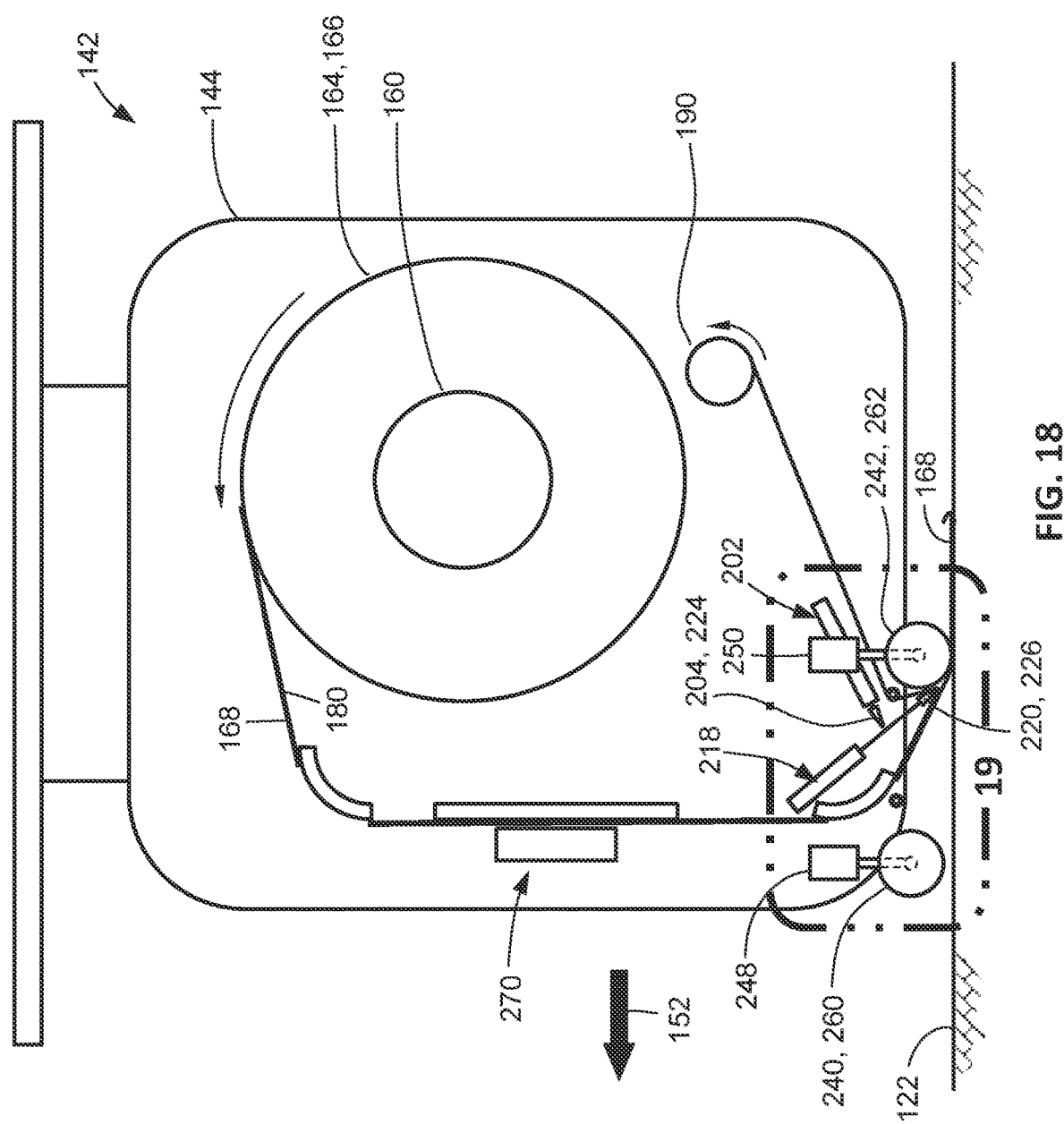
FIG. 18 shows the lamination head dispensing layup material onto the substrate during movement relative to the substrate along the second direction of travel.

As mentioned above, in the example manufacturing system 100 of FIGS. 1-5, the lamination heads 142 are stationary, and are configured to sequentially apply layup material 168 onto a movable lamination mandrel 124 and onto previously applied layup material 168 (FIG. 5) during one or more passes of the lamination mandrel 124 through the lamination station 140. The lamination heads 142 collectively dispense multiple courses 194 (FIG. 5) of layup material 168 as the lamination mandrel 124 passes underneath the lamination heads 142 along the first direction of travel 150 (FIG. 12), and along the second direction of travel 152 (FIG. 18). Each one of the lamination heads 142 in the series may be assigned a layup material 168 having a material configuration that corresponds to a desired ply stacking sequence of the final composite laminate. The outer surface of the lamination mandrel 124 may include a plurality of apertures 126 (FIG. 5) that may be coupled (e.g., via internal fluid conduits—not shown) to a vacuum pressure source 128 (FIG. 4). Activation of the vacuum pressure source 128 may generate vacuum pressure via the apertures 126 at the outer surface of the lamination mandrel 124 as a means to secure the layup material 168 in position on the lamination mandrel 124 during dispensing of the layup material 168 by the lamination heads 142. In some examples, a release film (not shown) may be applied (e.g., via the lamination head 142) onto the lamination surface (e.g., lamination mandrel 124). The release film may be perforated to allow the vacuum pressure at the apertures 126 to vacuum couple to the composite laminate 196 being laid up on top of the release film.

Referring to FIGS. 1-4, the manufacturing system 100 may include a base member 104 supported on a surface such as a factory floor. As mentioned above, the lamination surface 120 may be configured as a lamination mandrel 124. The lamination mandrel 124 may be movable or slidable along longitudinal rails 130 extending along the length of the base member 104. For example, the manufacturing system 100 may include a mandrel translation mechanism (not shown) such as a screw drive coupled to a drive motor for autonomously moving the lamination mandrel 124 under control of the controller 112. The mandrel translation mechanism may move the lamination mandrel 124 between a lamination surface home position 132 on one side of the lamination station 140, and a lamination surface aft position 134 on an opposite side of the lamination station 140.

In the example shown, the lamination heads 142 may be supported by a lamination head support structure 102. The lamination head support structure 102 may include a longitudinal beam 110 to which the lamination heads 142 may be mounted. Opposing ends of the longitudinal beam 110 may be respectively coupled to a pair of crossbeams 108. The opposing ends of each crossbeam 108 may be supported by vertically-oriented posts 106 which may extend upwardly from a factory floor. However, the lamination head support structure 102 may be provided in any one of a variety of alternative configurations, and is not limited to the configuration shown in FIGS. 1-4.

As an alternative to a movable lamination mandrel 124, the lamination surface 120 may be configured as a continuous loop lamination belt (not shown) supported by a series of internal belt rollers (not shown), and rotatably driven by a drive motor (not shown). The lamination belt may include an outer surface onto which layup material 168 may be dispensed by the lamination heads 142. In a still further example of the manufacturing system 100, the lamination surface 120 may be stationary, and the lamination heads 142 may be movable over the lamination surface 120 for dispensing layup material 168 for laying up a composite laminate 196. For example, the lamination heads 142 may be supported by a gantry (not shown), a rail-mounted system (not shown), or a cantilevered support system (not shown) for moving the lamination heads 142 along the first direction of travel 150 and along the second direction of travel 152 while dispensing layup material 168 onto the lamination surface 120. In another example, the manufacturing system 100 may include one or more robotic devices (not shown) for moving the lamination heads 142 over a lamination surface 120. In any one of the above-described examples, the manufacturing system 100 is not limited to a series of end-to-end lamination heads 142, but may include a single lamination head 142 that may be moved relative to a lamination surface 120 along the first direction of travel 150 and along the second direction of travel 152 for laying up a composite laminate 196. Furthermore, the lamination surface 120 is not limited to a generally planar elongated lamination surface 120, such as the presently-disclosed lamination mandrel 124. For example, the lamination surface 120 may be a movable layup tool such as a rotatable layup mandrel (not shown).

Figure 6:
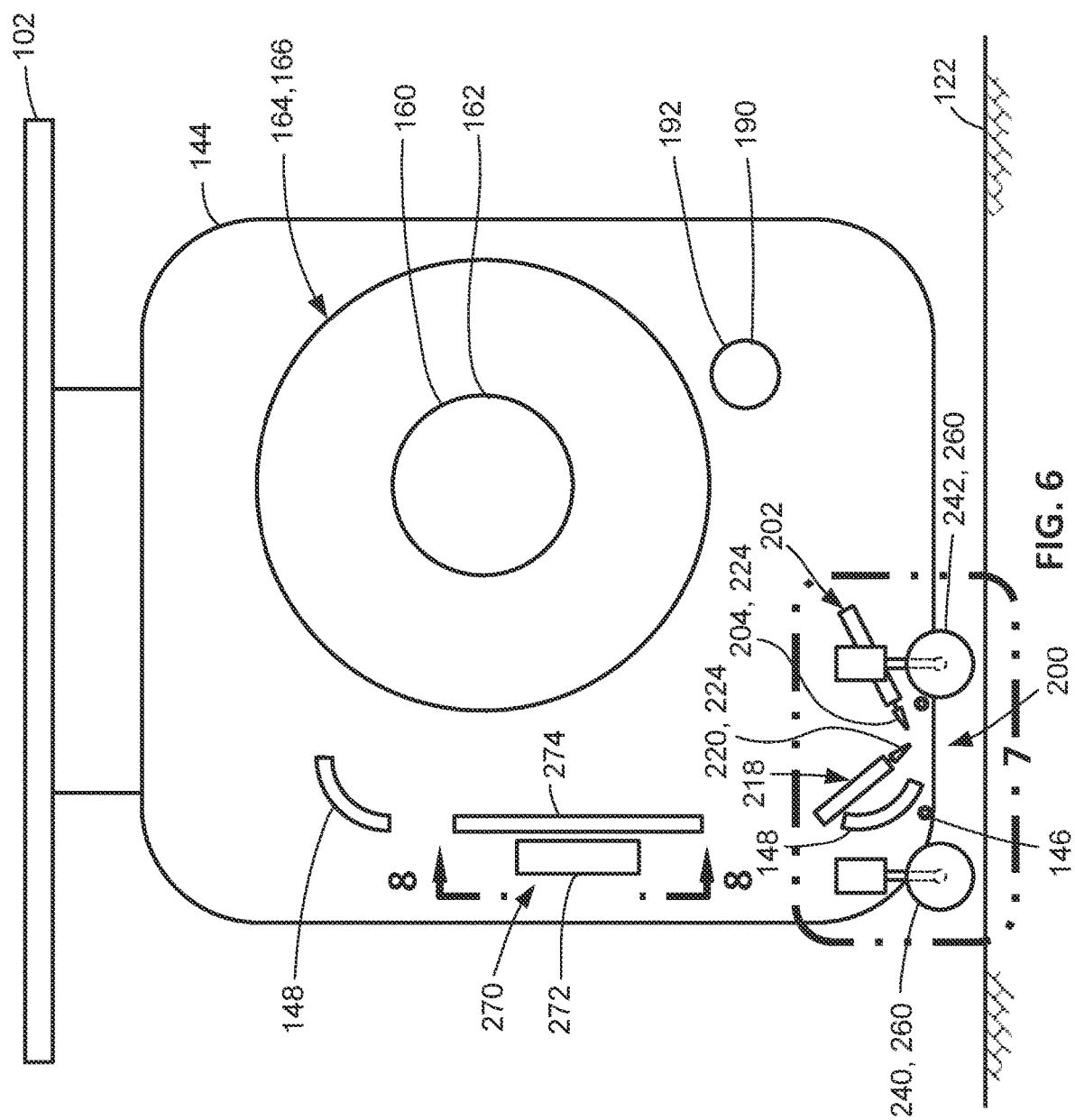
FIG. 6 is a magnified view of the lamination head identified by reference numeral 6 of FIG. 4, and illustrating a material supply drum supporting a material roll of layup material backed by a backing layer, and further illustrating a backing layer separation assembly for separating the layup material from the backing layer, and additionally illustrating first and second compaction devices for compacting the layup material onto the substrate during relative movement of the lamination head while a backing layer collection drum collects the backing layer.
Figure 7:
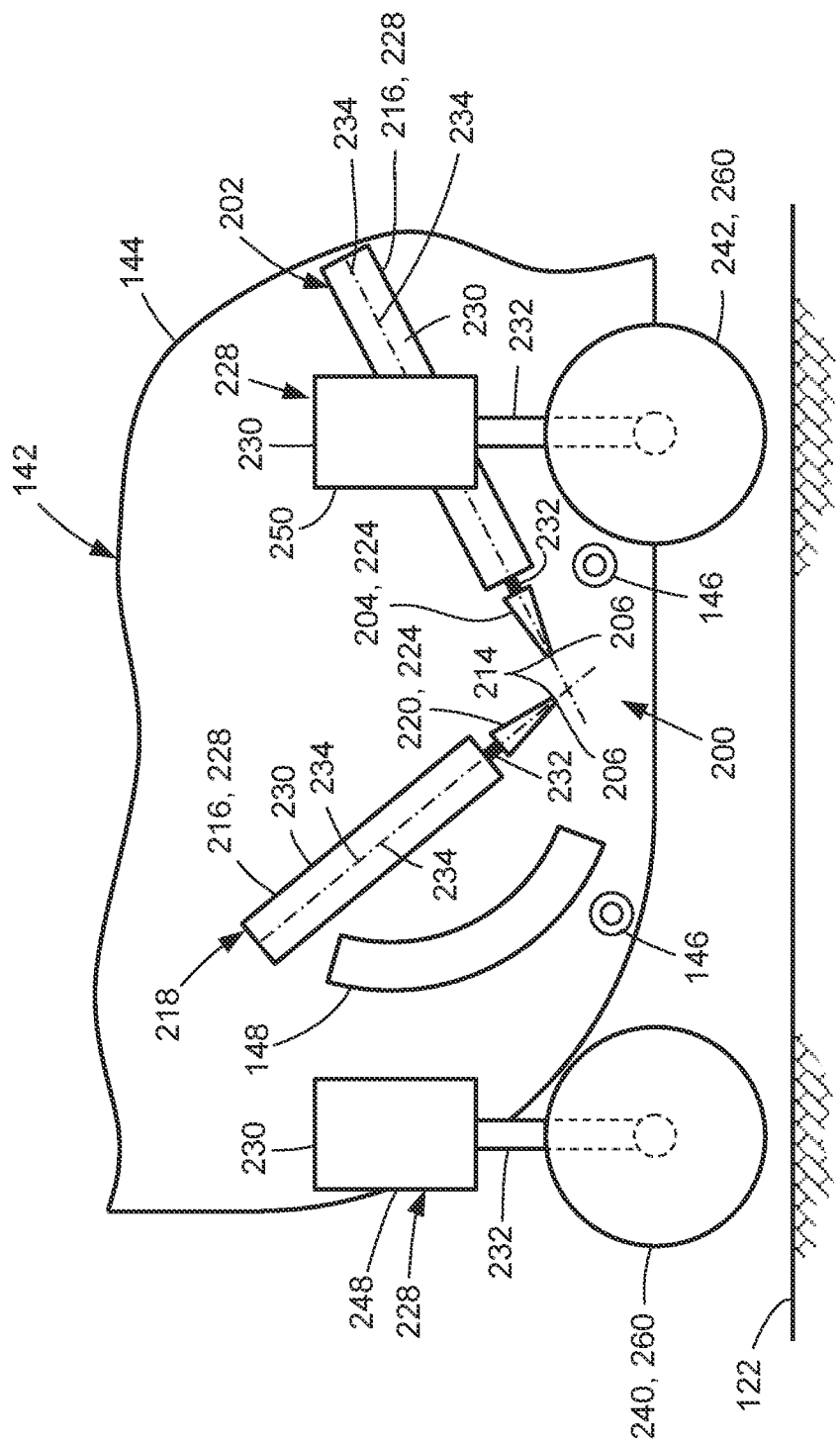
FIG. 7 is a magnified view of the portion of the lamination head identified by reference numeral 7 of FIG. 6, and illustrating the first and second separation devices each in a separation device retracted position, and illustrating the first and second compaction devices each in a compaction device retracted position.

Referring to FIGS. 6-7, shown is an example of a lamination head 142 having bi-directional layup capability for laying up a composite laminate 196 (FIG. 5). The lamination head 142 includes a material supply drum 160, a cutter assembly 270, a backing layer separation assembly 200, first and second compaction devices 240, 242, and a backing layer collection drum 190, each of which may be supported by a mounting frame 144. The mounting frame 144 may be configured as a plate structure or a truss structure, and may coupled to the lamination head support structure 102 in a mechanically stable manner.

The material supply drum 160 is configured to support a material roll 164 of backed material 166. The backing layer separation assembly 200 is configured to separate the layup material 168 from the backing layer 180, and guide the layup material 168 toward the substrate 122. The cutter assembly 270 is configured to cut the layup material 168 as the lamination head 142 approaches a designated start location and end location of a course 194 of layup material 168 being dispensed by the lamination head 142. The backing layer collection drum 190 is configured to take up or wind the backing layer 180 onto the backing layer collection drum 190 after separation of the layup material 168 from the backing layer 180 by the backing layer separation assembly 200.

In FIGS. 6-7, the lamination head 142 is shown prior to the threading of the backed material 166 (FIG. 12) through the above-mentioned components of the lamination head 142. The backed material 166 comprises a continuous length or strip of layup material 168 (FIG. 12) backed by a continuous backing layer 180 (FIG. 12). In some examples, the layup material 168 may be a composite material, such as a continuous strip of fiber-reinforced polymer matrix material (e.g., prepreg tape). The matrix material may be a thermosetting resin or a thermoplastic resin. The reinforcing fibers may be glass fibers (e.g., fiberglass), carbon fibers, boron, aramid, metallic fibers, ceramic fibers, or other fiber materials. In one example, the composite layup material 168 may be a carbon-fiber epoxy-resin prepreg tape. The composite material may be unidirectional tape or multidirectional tape (e.g., woven or fabric tape). The layup material 168 may have a width of up to 12 inches or more As an alternative to composite material, the layup material 168 may be a continuous strip of non-composite material backed by a backing layer 180. For example, the layup material 168 may be a metallic foil or a metallic mesh backed by a backing layer 180. In still other examples, the layup material 168 may be a processing material to assist in the processing (e.g., forming, consolidating, curing, handling) of the composite laminate 196. Examples of non-composite layup material include a release film, a tackifier film, a breather layer, a bleeder layer, peel ply, or any one of a variety of other types of non-composite layers, films, or adhesives that may be dispensed by the lamination head 142 prior to, during, or after the laying up of the composite laminate 196.

Referring still to FIGS. 6-7, the lamination head 142 may further include one or more guide rollers 146 mounted to the mounting frame 144. In addition, the lamination may include one or more guide surfaces 148 which may have a larger radius of curvature than the guide rollers 146. The larger radius of curvature of the guide surfaces 148 may facilitate the initial threading of the backed material 166 through the lamination head 142. In example shown, the lamination head 142 includes two guide surfaces 148, each having an approximately quarter-circular shape. The guide rollers 146 and guide surfaces 148 may guide the backed material 166 (FIG. 12) through the cutter assembly 270 (FIG. 12) and the backing layer separation assembly 200 of the lamination head 142. For example, the guide surfaces 148 respectively located above and below the cutter assembly 270 may facilitate the tensioning of the backed material 166 (FIG. 12) to enable precise control of the cutting of the layup material 168 (FIG. 12) without severing the backing layer 180.

In this regard, the guide rollers 146 and guide surfaces 148 may define a path for the backed material 166 through the lamination head 142 that prevents contact of the backed material 166 with the first and second compaction devices 240, 242, the first and second separation devices 202, 218, and other components of the lamination head 142 during dispensing of layup material 168 when the lamination head 142 is moving in the first direction of travel 150 (FIG. 12) and when the lamination head 142 is moving and the second direction of travel 152 (FIG. 18).

As shown in FIG. 6, the cutter assembly 270 may include a cutter module 272 and a cutter platen 274. The cutter platen 274 may be fixedly mounted to the mounting frame 144. The cutter module 272 may have at least one cutter blade 276 (FIG. 8). To provide clearance for threading the backed material 166 (e.g., at least the backing layer 180) through the cutter assembly 270, the cutter module 272 may be configured to horizontally translate away from the cutter platen 274 to a module home position (not shown) in which the cutter module 272 and the cutter platen 274 are spaced apart from each other. In preparation for cutting the layup material 168, the cutter module 272 may horizontally translate back toward the cutter platen 274 to a module engagement position in which the backed material 166 is sandwiched between the cutter module 272 and the cutter platen 274, as shown in FIG. 12. The depth of the cutter blade 276 may be precisely controlled to cut only the layup material 168 without cutting the backing layer 180. The processor may control the cutter assembly 270 in a manner to cut the layup material 168 immediately prior to the start of each course 194 (FIG. 5) of layup material 168 to be dispensed by the lamination head 142, and also cut the layup material 168 immediately prior to the lamination head 142 arriving at the predetermined end of the course 194.

As described below, the cut line 282 (e.g., FIGS. 9-11) in the layup material 168 creates a layup material leading edge 176 and a layup material trailing edge 178 abutting the layup material leading edge 176. When the layup material leading edge 176 arrives at the horn distal end 206 of the first horn 204 (FIG. 15) or second horn 220 (FIG. 21), the layup material leading edge 176 peels away from the backing layer 180 and is directed toward the substrate 122 and respectively underneath the first compaction device 240 (FIG. 15) or second compaction device 242 (FIG. 21), depending on whether the lamination head 142 is moving along the first direction of travel 150 (FIG. 13) or second direction of travel 152 (FIG. 19), as described in greater detail below.

Referring to FIGS. 8-11, shown is the progression of a cut line 282 being formed in the layup material 168 as the backed material 166 moves at a material feed rate through the cutter assembly 270. FIG. 8 shows the cutter blade 276 at a start location of the intended cut line 282 prior to the cutter blade 276 moving across the backed material 166 along a blade path angle. The cutter blade 276 may be configured to cut the layup material 168 as the backed material 166 moves along the cutter platen 274. FIGS. 9-10 shows the cutter blade 276 moving along the plate path angle at a blade speed defining a blade travel vector 278 for cutting the layup material 168 along the intended cut line 282. The blade travel vector 278 may have a longitudinal component 282 that is parallel to the lengthwise direction of the backed material 166. The longitudinal component 282 of the blade travel vector 278 is proportional to the material feed rate. FIG. 11 shows the cut line 282 formed in the layup material 168.

As mentioned earlier, the depth of the cutter blade 276 may be precisely controlled such that the backing layer 180 remains at least partially intact after cutting the layup material 168. In the example shown, the intended cut line 282 is oriented perpendicular to the lengthwise direction of the backed material 166. As such, the longitudinal component 282 of the blade travel vector 278 is equivalent to the material feed rate. For an intended cut line 282 that is oriented non-perpendicular (not shown) to the lengthwise direction of the backed material 166, the longitudinal component 282 of the blade travel vector 278 is either less than or greater than the material feed rate. Advantageously, moving the cutter blade 276 along the above-described blade travel vector 278 enables the layup material 168 to be cut without stopping the application of layup material 168 onto the substrate 122.

The backing layer separation assembly 200 (e.g., FIG. 12) is configured to receive the backed material 166 after being threaded through the cutter assembly 270, as mentioned above. As shown in FIGS. 6-7, the backing layer separation assembly 200 includes a first separation device 202 and a second separation device 218. The first separation device 202 includes a first horn 204 which is movable between a separation device retracted position 224 (FIG. 7) and a separation device extended position 226 (FIGS. 12-13) associated with the first separation device 202. The second separation device 218 includes a second horn 220 which is also movable between a separation device retracted position 224 (FIG. 7) and a separation device extended position 226 (FIGS. 18-19) associated with the second separation device 218.

As shown in FIG. 7, the first separation device 202 may include a first separation device actuator 216 configured as a linear actuator 228 to move the first horn 204 between the separation device retracted position 224 and the separation device extended position 226 (FIGS. 12-13) associated with the first separation device 202. The second separation device 218 may include a second separation device actuator 222 which may also be configured as a linear actuator 228 to move the second separation device 218 between the separation device retracted position 224 and the separation device extended position 226 (FIGS. 18-19) associated with the second separation device 218. In the example shown, each linear actuator 228 may be configured as a pneumatic actuator having a cylinder 230 and a rod 232 that is extensible from the cylinder 230. The linear actuator 228 may be a single-acting actuator or a double-acting actuator. As an alternative to a pneumatic actuator, the linear actuator 228 may be a hydraulic actuator or an electromechanical actuator.

Figure 16:
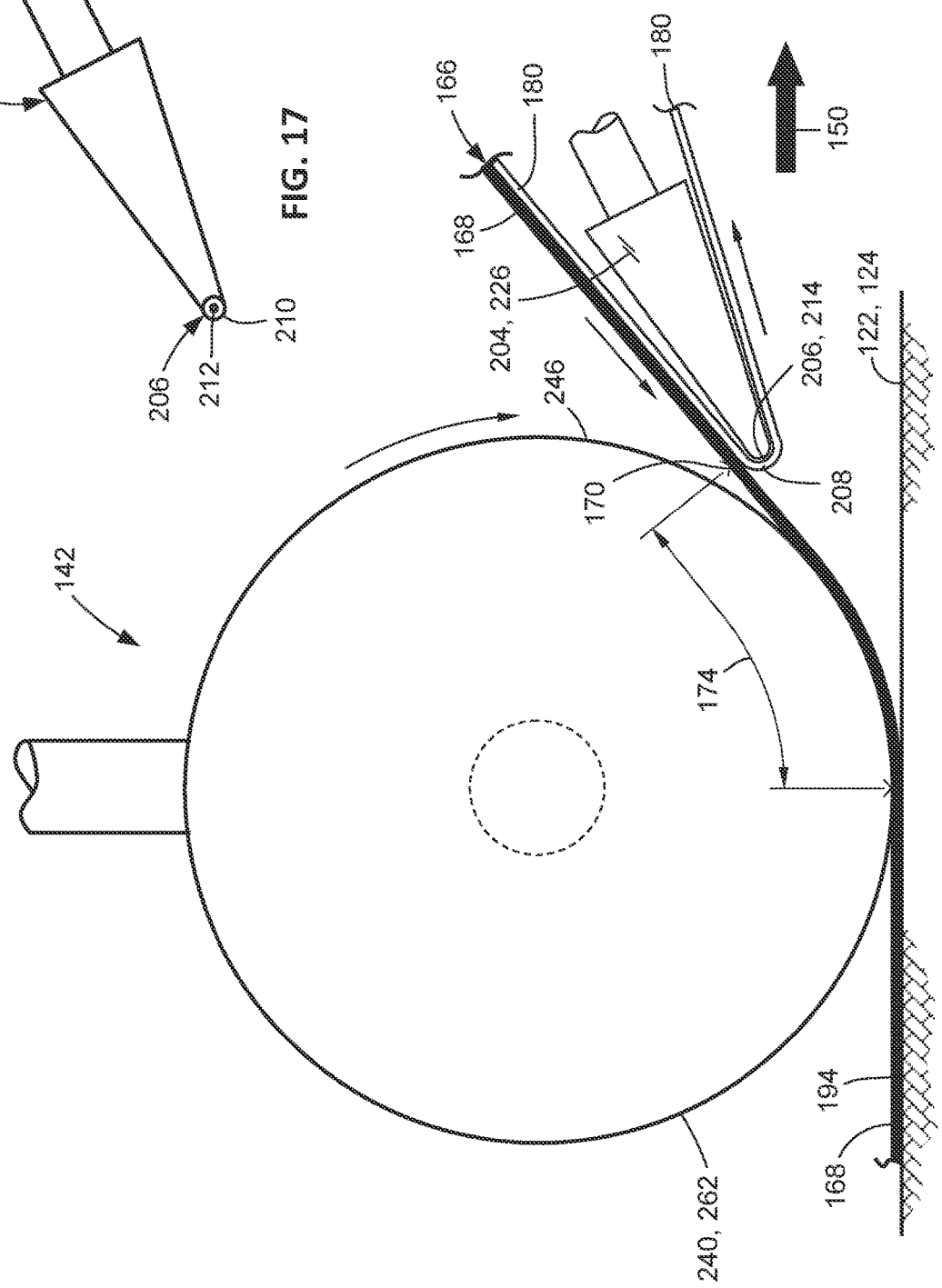
FIG. 16 shows the horn distal end in close proximity to the compaction device outer surface, and resulting in a relatively short length of the unsupported section of layup material extending between a layup material separation point on the horn distal end, and a layup material compaction point underneath the first compaction device.
Figure 22:
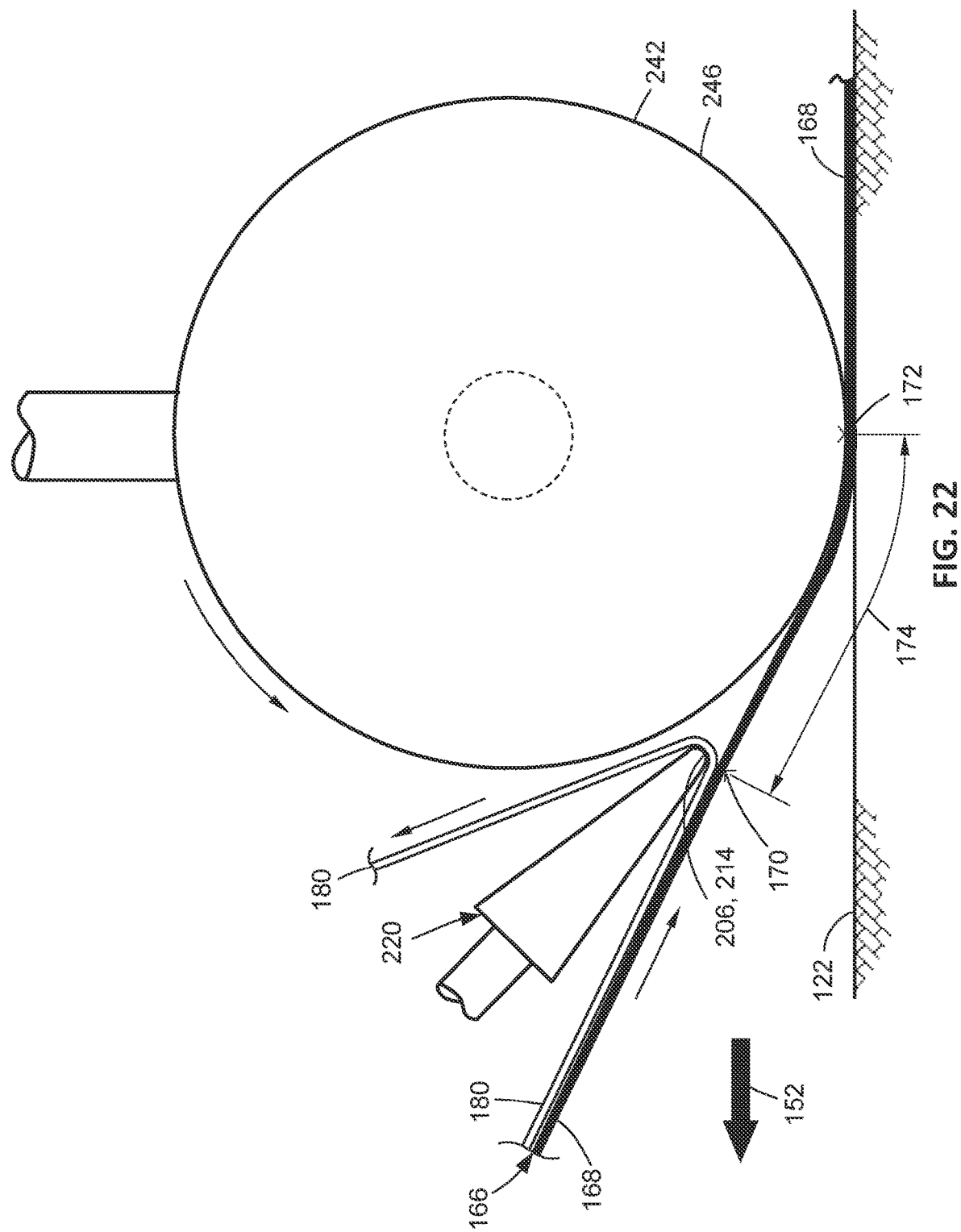
FIG. 22 shows the horn distal end in close proximity to the compaction device outer surface of the second compaction device, and resulting in a relatively short length of the unsupported section of layup material extending between the horn distal end and the layup material compaction point underneath the second compaction device.

Regardless of their specific configuration, the first separation device 202 and the second separation device actuator 222 each provide a simple mechanism for respectively moving the first horn 204 and the second horn 220 into close proximity respectively to the first compaction device 240 and second compaction device 242. As mentioned above, the ability to position the first horn 204 and second horn 220 in close proximity respectively to the first compaction device 240 and second compaction device 242 advantageously reduces the length of an unsupported section of layup material 174 between the horn distal end 206 and the substrate 122 (e.g., see FIGS. 16 and 22), and which reduces or minimizes undesirable tensioning and stretching of the layup material 168 prior to compaction onto the substrate 122. As shown in FIGS. 16 and 22 and described below, the unsupported section of layup material 174 is located between a layup material compaction point 172 respectively associated with the first or second compaction device 240, 242, and a layup material separation point 170 on the horn distal end 206 (i.e., respectively of the first or second horn 204, 220) where the layup material 168 separates from the backing layer 180.

The lamination head 142 also includes the first compaction device 240 and the second compaction device 242, each of which is configured to apply compaction pressure onto the layup material 168 against the substrate 122 as the layup material 168 is dispensed by the lamination head 142. For example, the first compaction device 240 is configured to apply compaction pressure onto the layup material 168 against the substrate 122 at a layup material compaction point 172 (FIG. 16) underneath the first compaction device 240 as the lamination head 142 moves along the first direction of travel 150 (FIG. 16). The second compaction device 242 is configured to apply compaction pressure onto the layup material 168 against the substrate 122 at a layup material compaction point 172 (FIG. 22) underneath the second compaction device 242 when the lamination head 142 is moving along the second direction of travel 152 (FIG. 22). Although shown as compaction rollers 244, the first and second compaction devices 240, 242 may be provided in alternative configurations. For example, the first and second compaction devices 240, 242 may each be configured as a compaction shoe (not shown), or as a resiliently compressible compaction bladder (not shown) for glide-forming of the layup material 168 onto a contoured lamination mandrel (not shown) having an outer surface that has a non-planar cross-sectional shape.

Referring to FIG. 7, the first compaction device 240 may include a first compaction device actuator 248 configured as a linear actuator 228 to move the first compaction device 240 between a compaction device retracted position 260 (e.g., a raised position) and a compaction device extended position 262 (e.g., a lowered position—FIGS. 12-13) associated with the first compaction device 240. Similarly, the second compaction device 242 may include a second compaction device actuator 250 also configured as a linear actuator 228 to move the second compaction device 242 between a compaction device retracted position 260 (e.g., a raised position) and a compaction device extended position 262 (e.g., a lowered position—FIGS. 18-19) associated with the second compaction device 242. When in the compaction device retracted position 260, the first or second compaction device 240, 242 may be in non-contacting relation to the substrate 122. When in the compaction device extended position 262, the first or second compaction device 240, 242 may be in contact with the substrate 122. In the present disclosure, the substrate 122 may be described as the surface of the lamination mandrel 124 or the recently dispensed course 194 of layup material 168.

Figure 13:
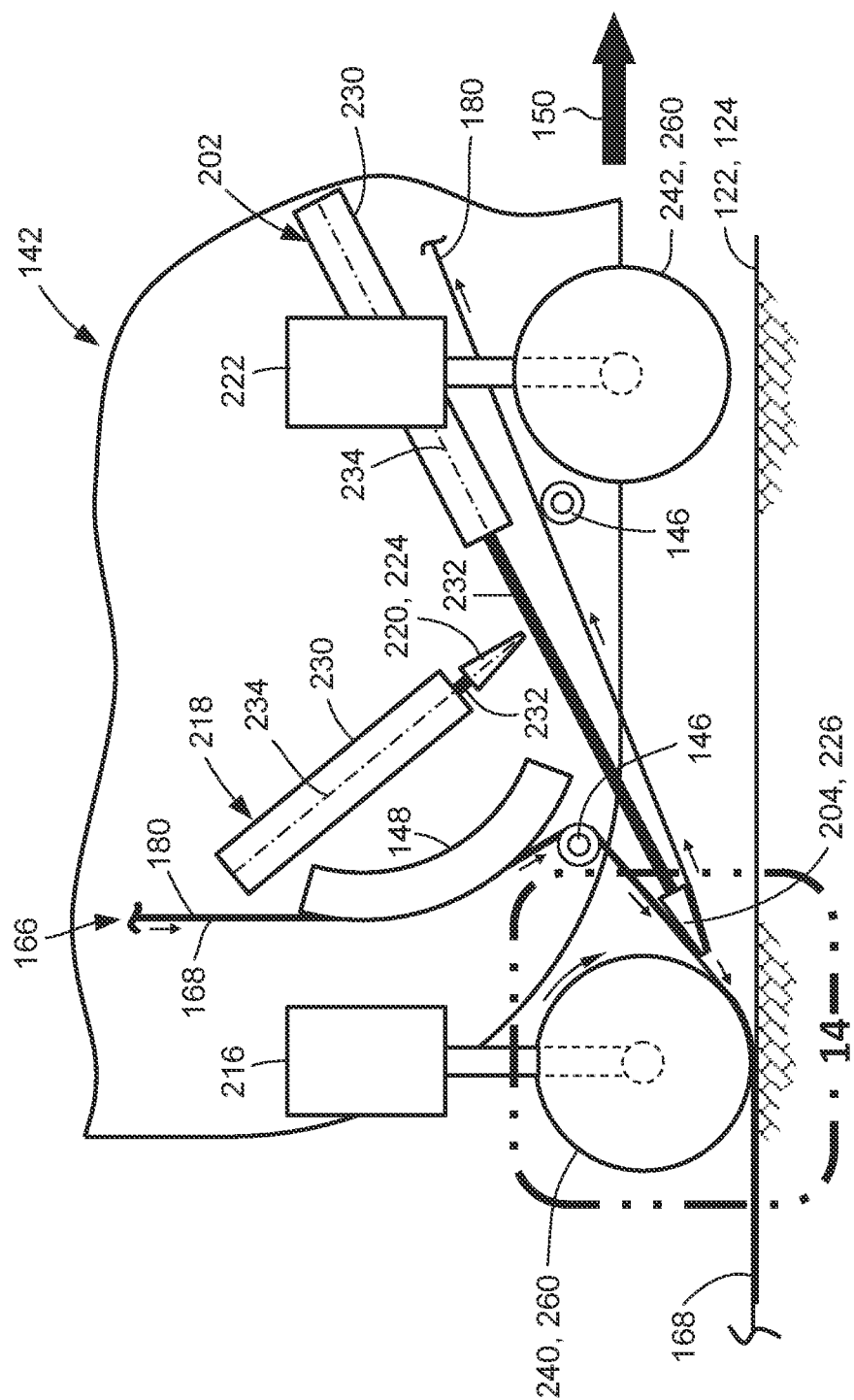
FIG. 13 is a magnified view of the portion of the lamination head identified by reference numeral 13 of FIG. 12, and illustrating the first separation device in a separation device extended position for separating the layup material from the backing layer and directing the layup material toward the substrate and underneath the first compaction device.
Figure 19:
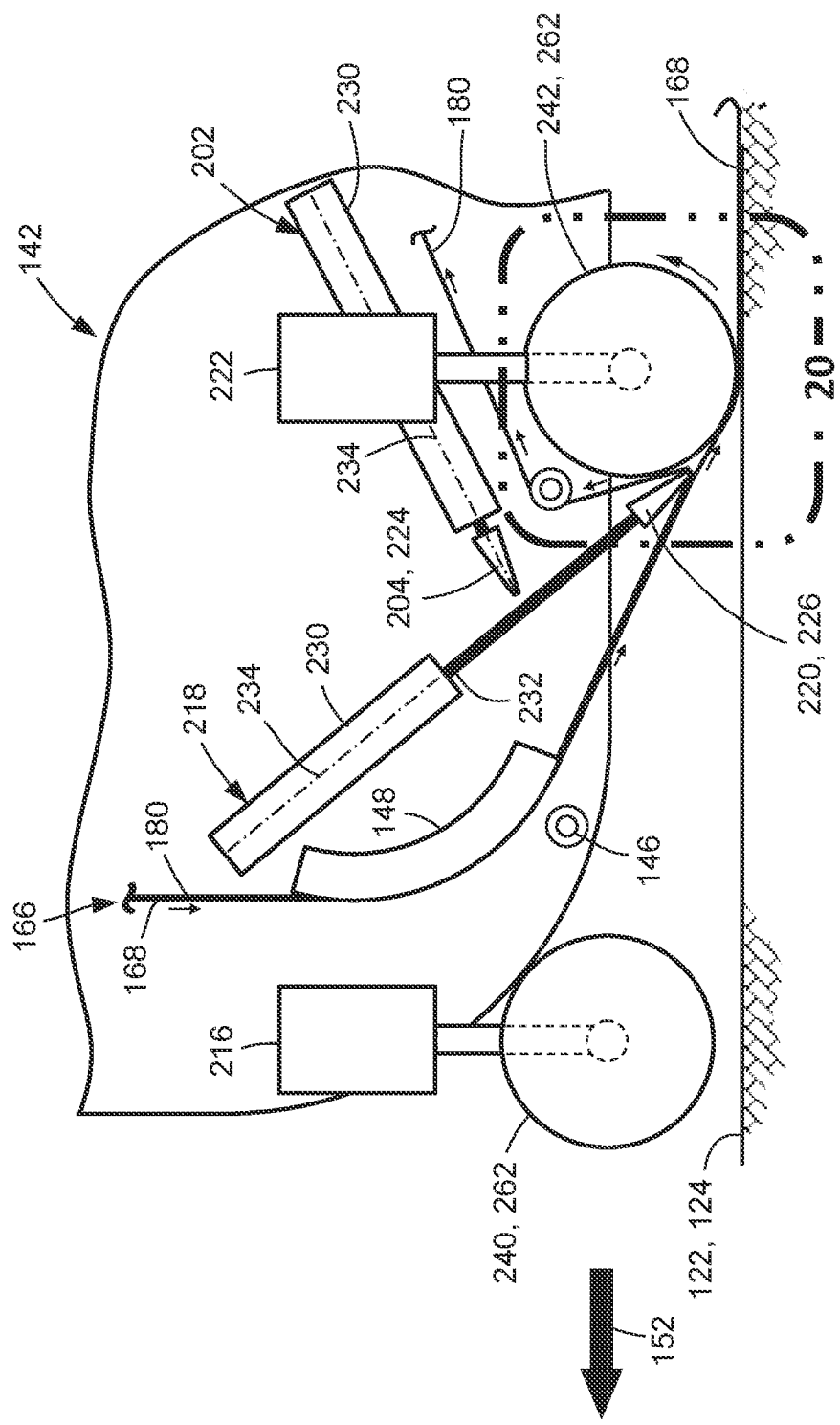
FIG. 19 is a magnified view of the portion of the lamination head identified by reference numeral 19 of FIG. 18, and illustrating the second separation device in the separation device extended position for separating the layup material from the backing layer and directing the layup material toward the substrate and underneath the second compaction device.

The first compaction device 240 may include a first compaction device actuator 248. The second compaction device 242 may include a second compaction device actuator 250. The first compaction device actuator 248 and/or the second compaction device actuator 250 may be configured as a linear actuator 228 to respectively move the first compaction device 240 and the second compaction device 242 between the compaction device retracted position 260 and the compaction device extended position 262. For example, as shown in FIG. 13 and described below, when the first compaction device 240 is in the compaction device extended position 262, the second compaction device 242 may be in the compaction device retracted position 260. As shown in FIG. 19, when the second compaction device 242 is in the compaction device extended position 262, the first compaction device 240 may be in the compaction device retracted position 260.

In the example of FIG. 7, the first compaction device actuator 248 and the second compaction device actuator 250 are each configured as a linear actuator 228. The linear actuator 228 may be a pneumatic actuator having a cylinder 230 and a rod 232 which may be extensible from the cylinder 230. However, as mentioned above with regard to the first and second separation device actuators 216, 222, the first and second compaction device actuators 248, 250 may be hydraulic actuators or electromechanical actuators. In the example shown, the first compaction device actuator 248 and the second compaction device actuator 250 may be oriented such that the rod 232 of the linear actuator 228 is vertically oriented, which may simplify the mounting and operation of the linear actuator 228.

As shown in FIGS. 12-13 and described in greater detail below, when the first separation device 202 is in the separation device extended position 226, the first horn 204 is in close proximity to the layup material compaction point 172 (FIG. 16) associated with the first compaction device 240. The first horn 204 is configured to cause the layup material 168 to separate from the backing layer 180 and direct the layup material 168 toward the substrate 122 and underneath the first compaction device 240 as the lamination head 142 moves along the first direction of travel 150. As shown in FIGS. 18-19 and described in greater detail below, when the second separation device 218 is in the separation device extended position 226, the second horn 220 is in close proximity to the layup material compaction point 172 (FIG. 22) associated with the second compaction device 242. The second horn 220 is configured to cause the layup material 168 to separate from the backing layer 180 and direct the layup material 168 toward the substrate 122 and underneath the second compaction device 242 as the lamination head 142 moves along the second direction of travel 152 opposite the first direction of travel 150.

In FIG. 7, the first horn 204 and the second horn 220 each have a horn distal end 206. The horn distal end 206 may have a relatively small radius of curvature 214 to cause the layup material leading edge 176 to separate from the backing layer 180 as the backing layer 180 moves around the horn distal end 206. As described in greater detail below, the first horn 204 and second horn 220 are each configured such that the separation of the layup material leading edge 176 from the backing layer 180 (e.g., FIGS. 15 and 21) results in the layup material leading edge 176 moving toward the substrate 122 and respectively underneath the first and second compaction devices 240, 242 (FIGS. 16 and 22). The radius of curvature 214 of the horn distal end 206 is such that the bending stiffness of the layup material 168 (i.e., in the axial direction) results in a peel force which urges the layup material 168 away from the backing layer 180 as the backing layer 180 moves around the horn distal end 206. In this regard, the relatively small radius of curvature 214 is such that the peel force of the layup material 168 exceeds the strength of the adhesive bond between the layup material 168 and the backing layer 180, and results in the separation of the layup material 168 from the backing layer 180.

In addition to causing the layup material leading edge 176 (FIGS. 15 and 21) to separate from the backing layer 180 as the backing layer 180 moves around the horn distal end 206, a relatively small radius of curvature 214 allows the horn distal end 206 of the first horn 204 and second horn 220 to be positioned in close proximity to the compaction device outer surface 246 (e.g., of the compaction roller 244) respectively of the first and second compaction devices 240, 242. By positioning the horn distal end 206 in close proximity to the compaction device outer surface 246, the length of the unsupported section of layup material 174 (FIGS. 16 and 22) between the horn distal end 206 and the layup material compaction point 172 may be reduced, relative to the length of unsupported section of layup material 174 that would otherwise occur if the horn distal end 206 had a large radius of curvature 214.

Referring still to FIG. 7, the first separation device actuator 216 and the second separation device actuator 222 may each include an actuator axis 234. The actuator axis 234 of the first separation device actuator 216 may be oriented in crossing relation to the actuator axis 234 of the second separation device actuator 222, which may allow for positioning the first and second separation devices 202, 218 in close proximity to each other. In the example shown, when the first horn 204 is in the separation device retracted position 224, the first horn 204 is on a side of the actuator axis 234 of the second separation device actuator 222 at a location providing clearance for the second horn 220 to move between the separation device retracted position 224 and the separation device extended position 226 of the second horn 220. When the second horn 220 is in the separation device retracted position 224, the second horn 220 is on a side of the actuator axis 234 of the first separation device actuator 216 at a location providing clearance for the first horn 204 to move between the separation device retracted position 224 and the separation device extended position 226 of the first horn 204. As described below, the first separation device 202 is configured to move the first horn 204 from the separation device retracted position 224 (FIG. 7) to the separation device extended position 226 (FIGS. 12-13) to allow the lamination head 142 to dispense layup material 168 while moving along the first direction of travel 150. Similarly, the second separation device 218 is configured to move the second horn 220 from the separation device retracted position 224 (FIG. 7) to the separation device extended position 226 (FIGS. 18-19) to allow the lamination head 142 to dispense layup material 168 while moving along the second direction of travel 152.

In FIG. 7, the actuator axis 234 of the first separation device actuator 216 and the second separation device actuator 222 may be oriented at an angle of less than 60 degrees relative to the substrate 122 surface. Alternatively, the angle of orientation of the actuator axes 234 of the first and second separation device actuators 216, 222 may be respectively measured relative to the first direction of travel 150 (FIG. 13) and the second direction of travel 152 (FIG. 19). In one example, each actuator axis 234 may be oriented at an angle of less than 30 degrees relative to the surface of the substrate 122. The actuator axis 234 of the first separation device actuator 216 may be oriented at an angle that points the horn distal end 206 of the first horn 204 in a downstream direction (e.g., relative to the first direction of travel 150 of the lamination head) and toward the layup material compaction point 172 of the first compaction device 240. Similarly, the actuator axis 234 of the second separation device actuator 222 may be oriented at an angle that points the horn distal end 206 respectively of the second horn 220 in a downstream direction (e.g., relative to the second direction of travel 152 of the lamination head) and toward the layup material compaction point 172 respectively of the second compaction device 242.

By orienting each actuator axis 234 of the first and second separation devices 202, 218 at a relatively small angle relative to the substrate 122 surface, the first horn 204 and second horn 220 may each be positioned at a relatively small distance to the layup material compaction point 172 respectively associated with the first and second compaction devices 240, 242, and which results in a shorter length of unsupported section of layup material 174 (FIGS. 16 and 22). In the present disclosure, the term "unsupported section of layup material" refers to the lengthwise section of layup material 168 that is unsupported by backing layer 180 and which is not in contact with the substrate 122. As described below, the combination of the relatively small radius of curvature 214 of the horn distal end 206, and the relatively small angle of the actuator axis 234 of the first and second separation device actuators 216, 222, allows the first and second horns 204, 220 to be positioned in close proximity to the layup material compaction point 172 respectively of the first and second compaction devices 240, 242, and which allows for a relatively short length of the unsupported section of layup material 174.

Referring now to FIGS. 12-13, shown is an example of the lamination head 142 dispensing layup material 168 during movement of the lamination head 142 relative to the lamination surface 120 along the first direction of travel 150. As the lamination head 142 prepares to move in the first direction of travel 150, the first compaction device 240 (e.g., compaction roller 244) is lowered into the compaction device extended position 262 and into contact with the substrate 122 (e.g., the outer surface of the lamination mandrel 124), and the first horn 204 of the first separation device 202 is extended toward the first compaction device 240. With the first horn 204 in the separation device extended position 226, the layup material 168 separates from the backing layer 180 and is compacted onto the substrate 122 by the first compaction device 240 while the lamination moves along the first direction of travel 150. The second compaction device 242 is in the compaction device retracted position 260 (e.g., raised position). The second horn 220 of the second separation device 218 is in the separation device retracted position 224 (e.g., raised position).

Figure 14:
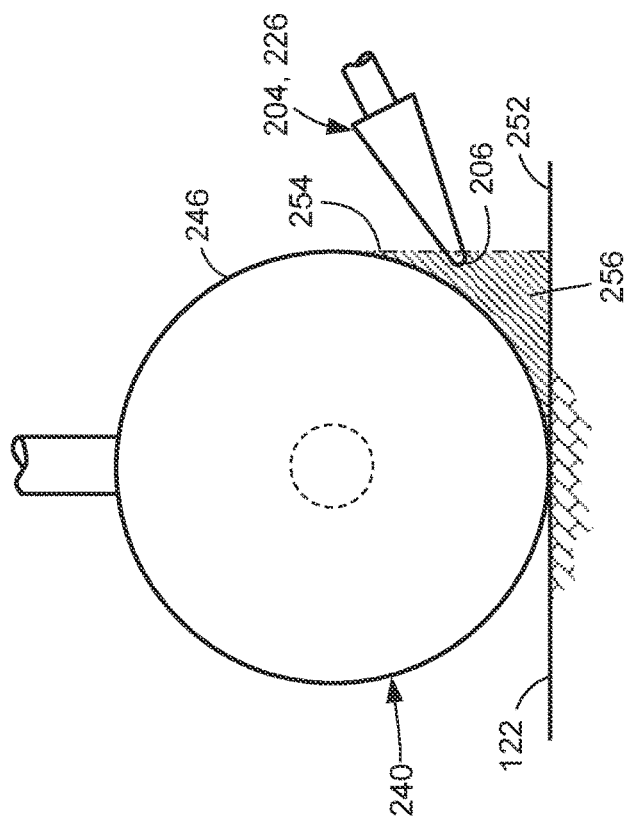
FIG. 14 is a magnified view of the portion of the lamination head identified by reference numeral 14 of FIG. 13, and illustrating a horn distal end of the first horn located within a first notch region defined between the compaction device outer surface of the first compaction device, a horizontal tangent to the compaction device outer surface, and a vertical tangent to the compaction device outer surface.

Referring to FIG. 14, shown is the first horn 204 in the separation device extended position 226, which places the horn distal end 206 within a first notch region 256 defined by the first compaction device 240 and the substrate 122. More specifically, the first notch region 256 may be bounded by the compaction device outer surface 246 of the first compaction device 240, a horizontal tangent 252 to the lowest point on the compaction device outer surface 246 (e.g., coincident with the substrate 122), and a vertical tangent 254 to the compaction device outer surface 246.

Figure 15:
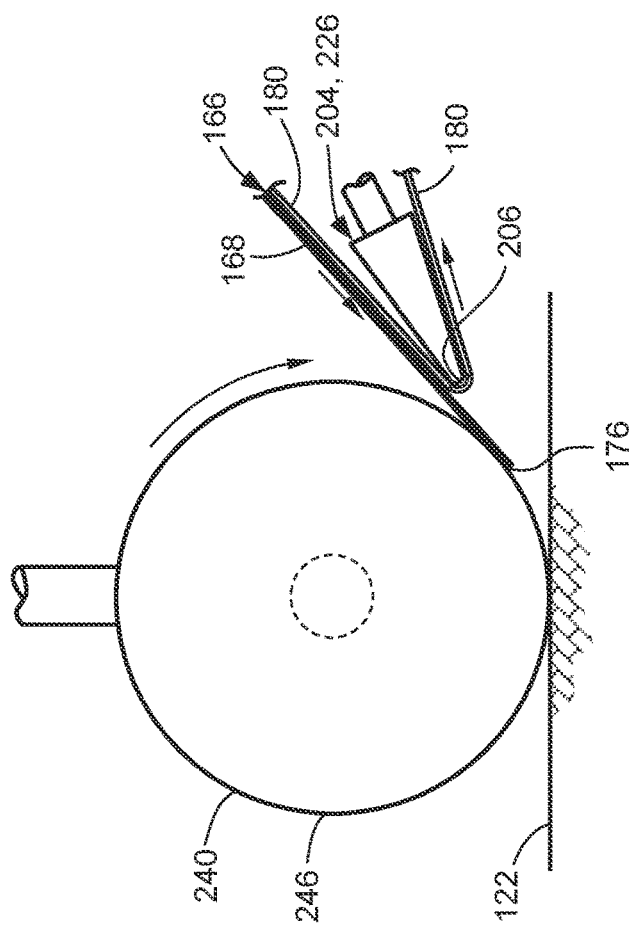
FIG. 15 shows the horn distal end separating the layup material from the backing layer, and directing the layup material toward the substrate and underneath the first compaction device during relative movement of the lamination head along the first direction of travel.

Referring to FIG. 15, shown is the layup material leading edge 176 after separation from the backing layer 180 and moving toward the substrate 122 as the backing layer 180 moves around the horn distal end 206 of the first horn 204. The first horn 204 is oriented and configured in a manner to facilitate the separation of the layup material 168 from the backing layer 180, and for guiding the layup material 168 toward the substrate 122 and underneath the first compaction device 240. In this regard, the first horn 204 may have a generally triangular cross-sectional shape with a rounded horn distal end 206. One side of the triangular cross-sectional shape of the first horn 204 may direct the layup material 168 toward the substrate 122 for compaction underneath the first compaction device 240. As mentioned above, the horn distal end 206 may have a relatively small radius of curvature 214 that causes the layup material 168 to separate from the backing layer 180. The opposite side of the triangular cross-sectional shape of the first horn 204 may be oriented in general alignment with the backing layer collection drum 190, as shown in FIG. 12.

Referring to FIG. 16, shown is an enlarged view of the first horn 204 in the separation device extended position 226 while layup material 168 is dispensed from the lamination head 142 moving relative to the lamination mandrel 124 along the first direction of travel 150. The horn distal end 206 is in close proximity to the compaction device outer surface 246. The relatively small radius of curvature 214 of the horn distal end 206 is such that the bending stiffness of the layup material 168 (i.e., in the axial direction) results in a peel force that exceeds the adhesive strength between the layup material 168 and the backing layer 180, resulting in separation of the layup material 168 from the backing layer 180 at the layup material separation point 170 on the horn distal end 206. In some examples of the lamination head 142, the radius of curvature 214 of the horn distal end 206 of the first horn 204 and/or the second horn 220 may be in the range of approximately 0.25-1.0 inch. However, in other examples of the lamination head 142, the horn distal end 206 may have a radius of curvature 214 that is less than 0.25 inch, or a radius of curvature 214 that is greater than 1.0 inch.

Also shown in FIG. 16 is the unsupported section of layup material 174, which extends between the layup material separation point 170 on the horn distal end 206, and the layup material compaction point 172 between the first compaction device 240 and the substrate 122. As mentioned above, the ability to position the horn distal end 206 into close proximity to the substrate 122 and the compaction device outer surface 246 results in a relatively short length of the unsupported section of layup material 174, which reduces undesirable stretching of the unsupported section of layup material 174. As mentioned above, reducing stretching of the layup material 168 reduces or eliminates local bunching and/or lifting of the layup material 174 that may accumulate in successively-applied courses 194 (FIG. 5) of the composite laminate 196, unless the composite laminate 196 is reworked.

Figure 17:
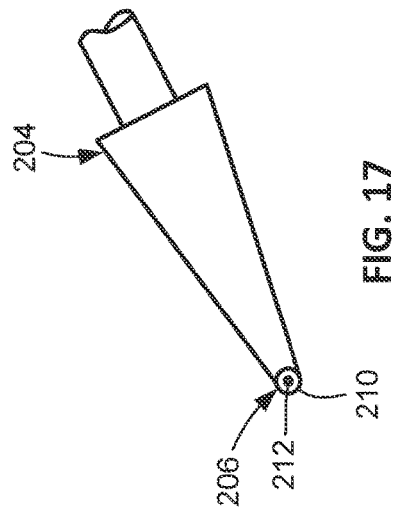
FIG. 17 shows an example of the horn distal end having a roller which is freely rotatable as the backing layer moves over the horn distal end.

Referring to FIG. 17, shown is in an arrangement of the first horn 204 in which the horn distal end 206 includes a roller 210 configured to freely rotate about a roller axis 212 while the backing layer 180 moves over the horn distal end 206. The roller 210 in FIG. 17 is an alternative to the horn distal end 206 shown in FIG. 16, which is configured as a sliding surface 208 or low-friction surface to facilitate free sliding of the backing layer 180 over the horn distal end 206. The sliding surface 208 may be a relatively smooth or polished surface, and may be formed of a metallic material or a non-metallic material. For example, the sliding surface 208 of the horn distal end 206 may include a low-friction coating such as Teflon™.

As mentioned above, when the lamination head 142 approaches the end of a pass, the cutter assembly 270 (FIG. 12) forms a cut line 282 (FIG. 11) across the width of the layup material 168 while the backed material 166 is moving through the cutter assembly 270. The cut line 282 defines a layup material leading edge 176 and a layup material trailing edge 178. When the cut line 282 in the layup material 168 reaches the layup material separation point 170 (FIG. 16) on the first horn 204, the rotation of the backing layer collection drum 190 (FIG. 12) may be temporarily halted to stop the movement of the backed material 166 through the lamination head 142, thereby preventing the layup material leading edge 176 (FIG. 11) from following the layup material trailing edge 178 (FIG. 11) toward the substrate 122. The lamination head 142 continues to move along the first direction of travel 150 until the layup material trailing edge 178 has been compacted onto the substrate 122 by the first compaction device 240. The layup material trailing edge 178 defines the end of the course 194 of layup material 168. The movement of the lamination head 142 may then stop, the first compaction device 240 retracts away from the substrate 122, and the first horn 204 retracts away from the first compaction device 240, as shown in FIG. 18.

Referring to FIGS. 18-19, at approximately the same time that the first compaction device 240 and the first separation device 202 are retracted, the second compaction device 242 is lowered into its compaction device extended position 262 onto the substrate 122, and the second horn 220 is extended to its separation device extended position 226 proximate the second compaction device 242. As the second horn 220 moves into the separation device extended position 226, the lamination head 142 starts moving along the second direction of travel 152 opposite the first direction of travel 150, and the rotation of the backing layer collection drum 190 is restarted to thereby resume pulling the backed material 166 through the lamination head 142. When the previously-mentioned layup material leading edge 176 (FIG. 11) reaches the layup material separation point 170 (FIG. 22) on the second horn 220, the layup material leading edge 176 separates from the backing layer 180 and moves toward the substrate 122 (FIG. 21) underneath the second compaction device 242 to start another course 194 of layup material 168. The process continues until a predetermined number of courses 194 (FIG. 5) of layup material 168 are applied to the substrate 122, thereby resulting in the uncured composite laminate 196 (FIG. 5).

As shown in FIG. 20, the horn distal end 206 of the second horn 220 in the separation device extended position 226 may extend into a second notch region 258 associated with the second compaction device 242, similar to the above-described the first notch region 256 associated with the first horn 204 as shown in FIG. 14. In FIG. 20, the second notch region 258 for the second horn 220 may be bounded by the compaction device outer surface 246 of the second compaction device 242, the horizontal tangent 252 to the lowest point of the compaction device outer surface 246 (e.g., coincident with the substrate 122), and the vertical tangent 254 to the compaction device outer surface 246 of the second compaction device 242.

FIG. 21 shows the layup material leading edge 176 after separation from the backing layer 180 and moving toward the substrate 122 as the backing layer 180 moves around the horn distal end 206 of the second horn 220. The second horn 220 may be configured similar to the above-described first horn 204. For example, the second horn 220 may have a triangular cross-sectional shape in which one side of the triangular cross-sectional shape directs the layup material 168 toward the substrate 122 for compaction underneath the second compaction device 242. The opposite side of the triangular cross-sectional shape of the second horn 220 may orient the backing layer 180 toward the guide roller 146 (FIG. 19) located immediately adjacent to the second compaction device 242. The guide roller 146 may redirect the backing layer 180 toward the backing layer collection drum 190 (FIG. 18).

Referring to FIG. 22, the horn distal end 206 of the second horn 220 may have a relatively small radius of curvature 214, and may be configured in any one the above-described configurations of the first horn 204. The small radius of curvature 214 of the horn distal end 206 of the second horn 220 may cause the layup material 168 to separate from the backing layer 180 at the layup material separation point 170 on the horn distal end 206, similar to the configuration of the first horn 204. The close proximity of the second horn 220 to the second compaction device 242 results in a relatively short length of unsupported section of layup material 174 between the layup material separation point 170, and the layup material compaction point 172 underneath the second compaction device 242, and which may prevent undesirable stretching of the unsupported section of layup material 174, thereby reducing or avoiding local bunching or lifting of the layup material 174 of the composite laminate 196 (FIG. 5).

The movement of the lamination head 142 relative to the lamination surface 120 (e.g., lamination mandrel 124) may be controlled by the controller 112 (FIG. 1) executing computer-readable program instructions (e.g., a numerical control program). In addition, the controller 112 may also control the operation of the cutter assembly 270 (FIG. 6), the rotation of the material supply drum 160 (FIG. 6), the rotation of the backing layer collection drum 190 (FIG. 6), the extension and retraction of the first and second horns 204, 220 (FIG. 6), and the extension and retraction of the first and second compaction devices 240, 242 (FIG. 6). For example, the controller 112 may translate the lamination mandrel 124 (FIG. 1) in synchronization with the operation the collection drum drive motor 192 (FIG. 6) to rotate the backing layer collection drum 190 (e.g., optionally in coordination with the rotational speed of the supply drum drive motor 162) for pulling the backed material 166 through the lamination head 142 while maintaining a constant tension load in the backing layer 180 during dispensing of layup material 168 from the lamination head 142. Further in this regard, the controller 112 may control the movement of the lamination mandrel 124 and the rotational speed of the backing layer collection drum 190 and/or the material supply drum 160 in a manner such that any tension load in the unsupported section of layup material 174 (e.g., FIGS. 16 and 22) is lower than the tension load in the backing layer 180.

Figure 23:
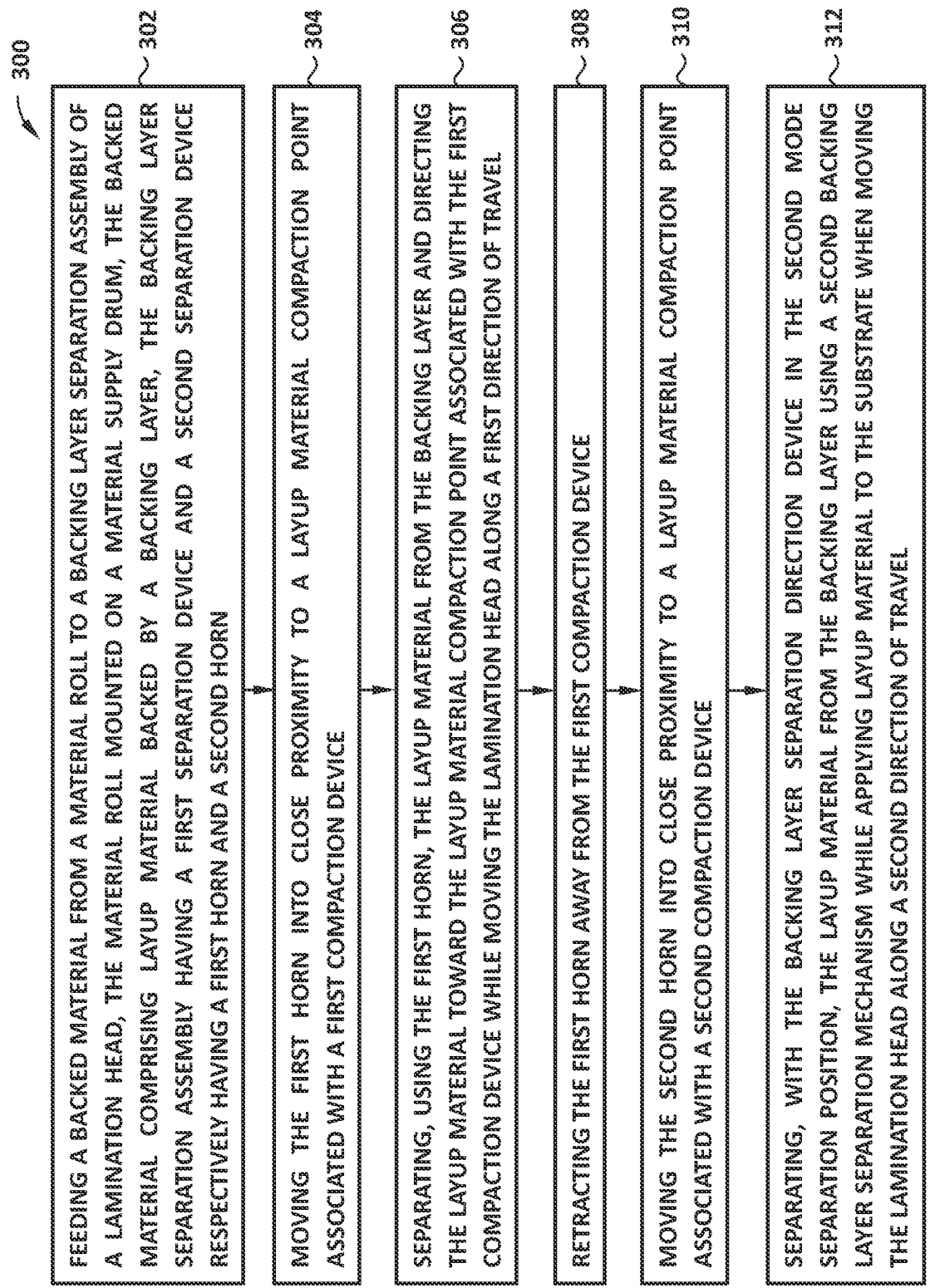
FIG. 23 is a flowchart of a method of bi-directionally applying layup material onto a substrate.

Referring to FIG. 23, shown is a method 300 of bi-directionally applying layup material 168 onto a substrate 122 using a lamination head 142. The method 300 may include supporting on a mounting frame 144 the material supply drum 160, the backing layer collection drum 190, the backing layer separation assembly 200, the first compaction device 240, and the second compaction device 242. In the example shown, the mounting frame 144 may be supported by a lamination head support structure 102 configured to suspend the lamination head 142 above a movable lamination surface 120 such as a lamination mandrel 124. Alternatively, the mounting frame 144 may be supported on a movable system such as a gantry (not shown) or a robotic device (not shown) for moving the lamination head 142 over a stationary lamination surface (not shown) or a moving lamination surface 120.

Step 302 of the method 300 includes feeding a backed material 166 from a material roll 164 to the backing layer separation assembly 200 of the lamination head 142. As mentioned above, the material roll 164 is mounted on the material supply drum 160. The backed material 166 comprises the layup material 168 backed by a backing layer 180. As described above, the backing layer separation assembly 200 has a first separation device 202 and a second separation device 218 respectively having a first horn 204 and a second horn 220.

Step 304 of the method 300 includes moving the first horn 204 into close proximity to a layup material compaction point 172 associated with a first compaction device 240. Prior to performing step 304 of moving the first horn 204, the method 300 may comprise retracting the second horn 220 away from the second compaction device 242 to a location providing clearance for the first horn 204 to move between the separation device retracted position 224 and the separation device extended position 226 of the first horn 204. Step 304 may include actuating a first separation device actuator 216 to move the first horn 204 between a separation device retracted position 224 and a separation device extended position 226 associated with the first horn 204. In the example described above, the first horn 204 may be mounted on the end of a rod 232 extending from a cylinder 230 of the first separation device actuator 216. Movement of the first horn 204 may be performed by extending the rod 232 from the cylinder 230, wherein the rod 232 defines an actuator axis 234 of the first separation device actuator 216. In such an arrangement, step 304 may comprise moving the first horn 204 along the actuator axis 234, which may be oriented at an angle of less than 60 degrees relative to the first direction of travel 150. The relatively shallow angle of orientation of the actuator axis 234 may allow the first horn 204 to be positioned in relatively close proximity to the substrate 122 and the compaction device outer surface 246 of the first compaction device 240.

Step 304 of moving the first horn 204 into close proximity to the layup material compaction point 172 associated with the first compaction device 240 may comprise moving the horn distal end 206 of the first horn 204 to within 0.5 inch of the substrate 122 and/or the compaction device outer surface 246 of the first compaction device 240. In some examples, the method 300 may include moving the horn distal end 206 of the first horn 204 into a first notch region 256 defined by the substrate 122 and the compaction device outer surface 246. As described above and shown in FIG. 14, the first notch region 256 may be bounded by the substrate 122, the compaction device outer surface 246 of the first compaction device 240, and a vertical tangent 254 to the compaction device outer surface 246.

Step 306 of the method 300 includes separating, using the first horn 204, the layup material 168 from the backing layer 180, and directing the layup material 168 toward the layup material compaction point 172 associated with the first compaction device 240 while moving the lamination head 142 along a first direction of travel 150. Step 306 of separating, using the first horn 204, the layup material 168 from the backing layer 180 may comprise pulling the backing layer 180 over a generally triangular cross-sectional shape of the first horn 204. As mentioned above, the triangular cross-sectional shape of the first horn 204 may direct the layup material 168 generally toward the layup material compaction point 172 underneath the first compaction device 240, and may also orient the backing layer 180 into general alignment with the backing layer collection drum 190.

Step 306 of separating, using the first horn 204, the layup material 168 from the backing layer 180, comprises pulling the backing layer 180 around a relatively small radius of curvature 214 of the horn distal end 206 of the first horn 204, thereby causing the layup material leading edge 176 to separate from the backing layer 180 as the backing layer 180 moves around the horn distal end 206. As mentioned above, the relatively small radius of curvature 214 of the horn distal end 206 is such that the bending stiffness of the layup material 168 results in a peel force that exceeds the strength of the adhesive bond between the layup material 168 and the backing layer 180, and results in the separation of the layup material 168 from the backing layer 180. Step 306 may optionally include pulling the backing layer 180 around a sliding surface 208 of the horn distal end 206. As mentioned above, the sliding surface 208 may have a static (i.e., non-movable) outer surface, which may be a low-friction surface or a coated surface. Alternatively, step 306 may include pulling the backing layer 180 around a roller 210 configured to freely rotate about a roller axis 212 as the backing layer 180 moves over the roller 210.

Prior to the layup material 168 contacting the substrate 122 after separating from the backing layer 180, the method 300 may comprise moving the first compaction device 240 into the compaction device extended position 262 in which the first compaction device 240 is in contact with the substrate 122. The first compaction device 240 may be moved into contact with the substrate 122 prior to, during, or immediately after moving the first horn 204 into close proximity to the first compaction device 240. The first compaction device 240 may be moved into the compaction device extended position 262 by extending a rod 232 from a cylinder 230 of a first separation device actuator 216 mounted to the lamination head 142. The method 300 may include compacting, using the first compaction device 240, the layup material 168 onto the substrate 122 as the layup material 168 is dispensed from the lamination head 142 while moving along the first direction of travel 150. The first compaction device 240 may be configured as a compaction roller 244, a compaction shoe, a compaction bladder, or another compaction device configuration.

When the lamination head 142, moving along the first direction of travel 150, arrives at the end of the course 194 of layup material 168 being applied to the substrate 122, the method 300 includes step 308 of retracting the first horn 204 away from the first compaction device 240. As mentioned above, relative movement of the lamination head 142 along the first direction of travel 150 may be halted once the layup material trailing edge 178 is compacted onto the substrate 122 by the first compaction device 240.

Step 310 of the method 300 includes moving the second horn 220 into close proximity to a layup material compaction point 172 associated with a second compaction device 242. The second horn 220 may be extended into close proximity with the second compaction device 242 at approximately the same time or immediately after the first horn 204 is retracted away from the first compaction device 240. Step 310 of moving the second horn 220 may include actuating a second separation device actuator 222 to move the second horn 220 between the separation device retracted position 224 and the separation device extended position 226 associated with the second horn 220. For example, step 310 may include extending a rod 232 from a cylinder 230 of a second separation device actuator 222, wherein the second horn 220 may be mounted on the end of the rod. Similar to the above-described arrangement of the first horn 204, the actuator axis 234 of the second separation device actuator 222 may be oriented at an angle of less than 60 degrees relative to the second direction of travel 152.

As mentioned above, the relatively shallow angle of orientation of the actuator axis 234 of the second separation device actuator 222 may allow the second horn 220 to be positioned in close proximity to the substrate 122 and the compaction device outer surface 246 of the second compaction device 242. Prior to moving the second horn 220 into the separation device extended position 226, step 310 may include retracting the first horn 204 away from the second compaction device 242 to a location providing clearance for the second horn 220 to move between the separation device retracted position 224 and the separation device extended position 226 of the second horn 220.

Step 310 of moving the second horn 220 into close proximity to the layup material compaction point 172 associated with the second compaction device 242 may comprise moving the horn distal end 206 of the second horn 220 into a second notch region 258 associated with the second compaction device 242. Similar to the above-described first notch region 256 of the first compaction device 240, the second notch region 258 of the second compaction device 242 may be bounded by the substrate 122, the compaction device outer surface 246 of the second compaction device 242, and a vertical tangent 254 to the compaction device outer surface 246 of the second compaction device 242. In some examples, step 310 may include moving the second horn 220 to within 0.5 inch of the substrate 122 and/or the compaction device outer surface 246 of the second compaction device 242.

Step 312 of the method 300 includes separating, using the second horn 220, the layup material 168 from the backing layer 180, and directing the layup material 168 toward the layup material compaction point 172 associated with the second compaction device 242 while moving the lamination head 142 along a second direction of travel 152 opposite the first direction of travel 150. Step 312 of separating, using the second horn 220, the layup material 168 from the backing layer 180 may comprise pulling the backing layer 180 over a generally triangular cross-sectional shape of the second horn 220. The triangular cross-sectional shape of the second horn 220 may direct the layup material 168 generally toward the layup material compaction point 172 underneath the second compaction device 242, and may also orient the backing layer 180 toward a guide roller 146 which may be redirect the backing layer 180 toward the backing layer collection drum 190.

Step 312 may include pulling the backing layer 180 around a relatively small radius of curvature 214 of the horn distal end 206 of the second horn 220 to cause the layup material leading edge 176 to separate from the backing layer 180, similar to above-described separation of the layup material 168 from the backing layer 180 moving around the first horn 204. In step 312, the backing layer 180 may be pulled around a sliding surface 208 of the horn distal end 206 of the second horn 220, or the backing layer 180 may be pulled around a freely-rotatable roller 210 mounted on the horn distal end 206 of the second horn 220.

The method 300 may comprise moving the second compaction device 242 into contact with the substrate 122 prior to the layup material 168 contacting the substrate 122. The second compaction device 242 may be configured as a compaction roller 244, a compaction shoe, a compaction bladder, or other compaction device configuration. The second compaction device 242 may be moved into contact with the substrate 122 prior to, during, or immediately after moving the second horn 220 into close proximity to the second compaction device 242. Similar to the above-described operation of the first compaction device 240, the second compaction device 242 may be moved into the compaction device extended position 262 by extending a rod 232 from a cylinder 230 of the second separation device actuator 222. The method 300 may include compacting, using the second compaction device 242, the layup material 168 onto the substrate 122 as the layup material 168 is dispensed from the lamination head 142 while moving along the second direction of travel 152.

As the backed material 166 moves through the lamination head 142, the method 300 may include defining a path for the backed material 166 through the lamination head 142 using one or more guide rollers 146 and/or guide surfaces 148. In addition, the guide rollers 146 and/or guide surfaces 148 may help to maintain tension in the backing layer 180. In this regard, the method 300 may include pulling, using the backing layer collection drum 190, the backed material 166 through the lamination head 142 while maintaining constant tension load in the backing layer 180 during application of the layup material 168 onto the substrate 122. As mentioned above, the lamination head 142 may include a collection drum drive motor 192 for rotating the backing layer collection drum 190. The method 300 may include controlling the rotational speed of the collection drum drive motor 192 in coordination with the speed of movement of the lamination surface 120 (e.g., lamination mandrel 124) in a manner causing the layup material 168 to be dispensed onto the substrate 122 with a tension load in the unsupported section of layup material 174 (FIGS. 16 and 22) that is lower than the tension load in the backing layer 180. As mentioned above, reducing or eliminating tension in the unsupported section of the layup material 174 may avoid undesirable stretching of the layup material 168, which may thereby improve the quality of the final composite laminate (not shown).

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A lamination head having bi-directional layup capability for laying up a composite laminate, the lamination head comprising:
    a material supply drum configured to support a material roll of backed material, the backed material comprising layup material backed by a backing layer;
    a first separation device having a first horn movable between a separation device retracted position and a separation device extended position;
    a second separation device having a second horn movable between a separation device retracted position and a separation device extended position;
    a first compaction device and a second compaction device configured to alternately apply compaction pressure onto the layup material against a substrate at a layup material compaction point;
    wherein:
    when the first separation device is in the separation device extended position and the first horn is in close proximity to the layup material compaction point associated with the first compaction device, the first horn is configured to cause the layup material to separate from the backing layer and direct the layup material toward the substrate and underneath the first compaction device as the lamination head moves along a first direction of travel; and
    when the second separation device is in the separation device extended position and the second horn is in close proximity to the layup material compaction point associated with the second compaction device, the second horn is configured to cause the layup material to separate from the backing layer and direct the layup material toward the substrate and underneath the second compaction device as the lamination head moves along a second direction of travel opposite the first direction of travel.

2. The lamination head of claim 1, wherein:
    the first separation device and the second separation device respectively having a first separation device actuator and a second separation device actuator configured as a linear actuator to respectively move the first separation device and the second separation device between the separation device retracted position and the separation device extended position.

3. The lamination head of claim 2, wherein:
    the first separation device actuator and the second separation device actuator each have an actuator axis oriented at an angle of less than 60 degrees respectively relative to the first direction of travel and the second direction of travel.

4. The lamination head of claim 2, wherein:
    the first separation device actuator and the second separation device actuator each have an actuator axis;
    the actuator axis of the first separation device actuator is oriented in crossing relation to the actuator axis of the second separation device actuator;
    when the first separation device is in the separation device retracted position, the first horn is on a side of the actuator axis of the second separation device actuator at a location providing clearance for the second horn to move between the separation device retracted position and the separation device extended position of the second separation device actuator; and
    when the second separation device is in the separation device retracted position, the second horn is on a side of the actuator axis of the first separation device actuator at a location providing clearance for the first horn to move between the separation device retracted position and the separation device extended position of the first separation device actuator.

5. The lamination head of claim 1, wherein:
    the first horn and the second horn each have a horn distal end; and
    the horn distal end having a radius of curvature configured to cause the layup material to separate from the backing layer as the backing layer moves around the radius of curvature of the horn distal end.

6. The lamination head of claim 5, wherein:
    the radius of curvature is between 0.25-1.0 inch.

7. The lamination head of claim 5, wherein the horn distal end includes:
one of a sliding surface and a roller at the horn distal end;
the sliding surface being a low-friction surface configured to facilitate free sliding of the backing layer over the horn distal end; and
the roller configured to freely rotate about a roller axis as the backing layer moves over the horn distal end.

8. The lamination head of claim 5, wherein:
the first separation device and the second separation device are configured such that when the first horn and the second horn are respectively in the separation device extended position, the horn distal end respectively of the first horn and the second horn is located respectively within a first notch region and second notch region respectively defined between a compaction device outer surface respectively of the first compaction device and the second compaction device, a horizontal tangent to the compaction device outer surface, and a vertical tangent to the compaction device outer surface.

9. The lamination head of claim 1, wherein:
the first compaction device and the second compaction device respectively include a first compaction device actuator and a second compaction device actuator configured as a linear actuator to alternately move the first compaction device and the second compaction device between a compaction device retracted position and a compaction device extended position.

10. The lamination head of claim 1, further comprising:
a controller;
a backing layer collection drum rotatably driven by a collection drum drive motor; and
the controller configured to control a rotational speed of the collection drum drive motor to cause the backing layer collection drum to pull the backed material through the lamination head to dispense the layup material onto the substrate in a manner such that a tension load in an unsupported section of the layup material is lower than the tension load in the backing layer, the unsupported section of the layup material being located between the layup material compaction point respectively associated with the first or second compaction device, and a layup material separation point respectively of the first or second horn.

11. A lamination head having bi-directional layup capability, comprising:
a material supply drum configured to support a material roll of backed material, the backed material comprising layup material backed by a backing layer;
a first separation device having a first horn movable between a separation device retracted position and a separation device extended position;
a second separation device having a second horn movable between a separation device retracted position and a separation device extended position;
a first compaction device and a second compaction device each movable between a compaction device retracted position and a compaction device extended position, and configured to apply compaction pressure onto the layup material against a substrate at a layup material compaction point;
wherein:
when the first separation device is in the separation device extended position and the second separation device is in the separation device retracted position, the first horn is in close proximity to the layup material compaction point associated with the first compaction device for separating the layup material from the backing layer as the lamination head moves along a first direction of travel; and
when the second separation device is in the separation device extended position and the first separation device is in the separation device retracted position, the second horn is in close proximity to the layup material compaction point associated with the second compaction device for separating the layup material from the backing layer as the lamination head moves along a second direction of travel opposite the first direction of travel.

12. A method of bi-directionally applying layup material onto a substrate, comprising:
feeding a backed material from a material roll to a backing layer separation assembly of a lamination head, the material roll mounted on a material supply drum, the backed material comprising the layup material backed by a backing layer, the backing layer separation assembly having a first separation device having a first horn, and a second separation device having a second horn;
moving the first horn into close proximity to a layup material compaction point associated with a first compaction device;
separating, using the first horn, the layup material from the backing layer and directing the layup material toward the layup material compaction point associated with the first compaction device while moving the lamination head along a first direction of travel;
retracting the first horn away from the first compaction device;
moving the second horn into close proximity to a layup material compaction point associated with a second compaction device; and
separating, using the second horn, the layup material from the backing layer and directing the layup material toward the layup material compaction point associated with the second compaction device while moving the lamination head along a second direction of travel opposite the first direction of travel.

13. The method of claim 12, wherein moving the first horn and moving the second horn respectively comprise:
actuating a first separation device actuator and a second separation device actuator to respectively move the first horn and the second horn between a separation device retracted position and a separation device extended position respectively associated with the first horn and the second horn.

14. The method of claim 12, wherein moving the first horn and moving the second horn respectively comprise:
respectively moving the first horn and the second horn along an actuator axis oriented at an angle of less than 60 degrees respectively relative to the first direction of travel and the second direction of travel.

15. The method of claim 12, wherein prior to moving the first horn and prior to moving the second horn, the method respectively comprises:
retracting the second horn away from the second compaction device to a location providing clearance for the first horn to move between a separation device retracted position and a separation device extended position of the first horn; and
retracting the first horn away from the first compaction device to a location providing clearance for the second horn to move between the separation device retracted position and the separation device extended position of the second horn.

16. The method of claim 12, wherein separating, respectively using the first horn and the second horn, the layup material from the backing layer comprise:
  pulling the backing layer around a radius of curvature of a horn distal end configured to cause the layup material to separate from the backing layer.

17. The method of claim 16, wherein separating, respectively using the first horn or the second horn, the layup material from the backing layer comprise:
  pulling the backing layer around one of a sliding surface and a roller at the horn distal end.

18. The method of claim 12, wherein moving respectively the first horn and the second horn into close proximity to the layup material compaction point respectively associated with the first compaction device and the second compaction device respectively comprise:
  moving a horn distal end of the first horn into a first notch region defined between a compaction device outer surface of the first compaction device, a horizontal tangent to the compaction device outer surface of the first compaction device, and a vertical tangent to the compaction device outer surface of the first compaction device; and
  moving a horn distal end of the second horn into a second notch region defined between the compaction device outer surface of the second compaction device, a horizontal tangent to the compaction device outer surface of the second compaction device, and a vertical tangent to the compaction device outer surface of the second compaction device.

19. The method of claim 12, further comprising:
  moving the first compaction device into contact with the substrate immediately prior to, during, or immediately after moving the first horn into close proximity to the layup material compaction point associated with the first compaction device; and
  moving the second compaction device into contact with the substrate and moving the first compaction device away from the substrate immediately prior to, during, or immediately after moving the second horn into close proximity to the layup material compaction point associated with the second compaction device.

20. The method of claim 12, wherein the lamination head includes a backing layer collection drum driven by a collection drum drive motor, the method further comprising:
  controlling a rotational speed of the collection drum drive motor in coordination with linear speed of the lamination head along the first direction of travel and the second direction of travel in a manner causing the backing layer collection drum to pull the backed material through the lamination head, and cause the layup material to be dispensed onto the substrate with a tension load in an unsupported section of the layup material that is lower than the tension load in the backing layer;
  wherein the unsupported section of layup material is located between the layup material compaction point respectively associated with the first compaction device or the second compaction device, and a layup material separation point on a horn distal end respectively of the first or second horn.

* * * * *